(12) United States Patent
Lewis

(10) Patent No.: US 6,836,288 B1
(45) Date of Patent: Dec. 28, 2004

(54) AUTOMATIC EXPOSURE CONTROL SYSTEM AND METHOD

(75) Inventor: Gregory M. Lewis, Goleta, CA (US)

(73) Assignee: Linvatec Corporation, Largo, FL (US)

( * ) Notice: Subject to any disclaimer, the term of this patent is extended or adjusted under 35 U.S.C. 154(b) by 0 days.

(21) Appl. No.: 09/248,150

(22) Filed: Feb. 9, 1999

(51) Int. Cl.[7] .................. H04N 5/235; H04N 5/335; H04N 7/18; G03B 7/00
(52) U.S. Cl. ................ 348/229.1; 348/297; 348/221.1; 348/362; 348/65
(58) Field of Search ..................... 348/221.1, 229.1, 348/296, 255, 230.1, 362, 367, 65

(56) References Cited

U.S. PATENT DOCUMENTS

| | | | | |
|---|---|---|---|---|
| 5,162,913 A | * | 11/1992 | Chatenever et al. | .......... 348/65 |
| 5,233,428 A | * | 8/1993 | Alford et al. | ............... 348/296 |
| 5,283,632 A | * | 2/1994 | Suzuki et al. | ............. 348/223.1 |
| 5,737,018 A | * | 4/1998 | Shimizu et al. | ............. 348/255 |
| 5,831,676 A | * | 11/1998 | Takahashi et al. | .......... 348/362 |
| 6,154,574 A | * | 11/2000 | Paik et al. | ................... 348/354 |
| 6,567,123 B1 | * | 5/2003 | Hashimoto | ............... 348/229.1 |

* cited by examiner

*Primary Examiner*—Andrew Christensen
*Assistant Examiner*—Nhan Tran
(74) *Attorney, Agent, or Firm*—Howrey Simon Arnold & White, LLP

(57) ABSTRACT

A method and apparatus for adjusting the exposure of a video camera characterized in one embodiment by a desired effective exposure which is determined responsive to measurement of a brightness parameter, a gain to be applied to amplification of an image which is derived from the desired effective exposure and the integration time period applicable to capture of the image, and an integration time period to be applied to image capture of an image which is derived from the desired effective exposure and a nominal gain.

23 Claims, 27 Drawing Sheets

| Module | Inputs | Output |
|---|---|---|
| Gain Module | $ITP_{n-X4}$, $DEE_n$ | $GAIN_n$ |
| Integration Time Module | NG, $DEE_n$, $BPR_n$ | $ITP_n$ |
| DEE Module | $DEE_{n-X3}$ | $DEE_n$ |
| Brightness Parameter Module | $ABP_n$, $DBP_n$ | $BPR_n$ |

Fig. 8

```c
// Processor headers
#include "adc.h"
#include "gpt.h"
#include "gsm.h"
#include "sim.h"

// Project headers
#include "serial.h"
#include "global.h"
#include "intense.h"
#include "exposure.h"

void delay100(void);
void SendShutter(unsigned short shutter);
void SendSmoothShutter(unsigned short smooth);
void SendWindowSize(unsigned short size);
unsigned short GetLumaAverage(void);

//-------------------------------------------
#pragma TRAP_PROC SAVE_REGS
void VSyncISR(void)
{
    if (IsFlagSet(FLAG_ADJ_NULL))
    {
        gLumaAverage = GetLumaAverage();
        sim->portb  |= 0x04;           // FEEDBACK_RESET = 1
        vrtcnt++;
        delay100();
    } else {
        gLumaAverage = GetLumaAverage();
```

Fig. 10a

```
        sim->portb  |= 0x04;                         // FEEDBACK_RESET = 1
vrtcnt++;
        ComputeExposure();
        if (gLastShutterValue != gShutterValue)
        {
                gLastShutterValue = gShutterValue;
                SendShutter(gShutterValue);
        }
        if (gLastMDACValue != gMDACValue && !IsFlagSet(FLAG_TITLER_XFER_IN_PROGRESS))
        {
                gLastMDACValue = gMDACValue;
                SendGain(gMDACValue);
        }
}
// Enable the integrator & peak detector
sim->portb  &= ~0x04;                  // FEEDBACK_RESET = 0
gpt->tflg1  &= ~0x01;                  // Clear IC1 interrupt flag
}
//--------------------------------------------------------------------
unsigned short GetLumaAverage(void)
{
        int result;
        adc->mcr  = 0x0080;                          // Turn the ADC on
        adc->ctl0 = 0x0083;
        adc->ctl1 = 0x20;                            // Start conversion on channels 0-4
        while ((adc->stat & 0x8000) == 0) ;          // Wait 'til done
        result = adc->urj[1];                        // AN1
        adc->mcr = 0x8080;                           // Turn the ADC off
        return result;
}
```

Fig. 10b

```c
//------------------------------------------------------------
void SendShutter(unsigned short shutter)
{
    // Write Low Byte
    sim->porth = shutter & 0x00FF;
    sim->portc &= ~0x08;                // HIGH/LOW* BYTE       = 0
    sim->portc &= ~0x02;                // SHTR_PULSE_LATCH     = 0
    sim->portc |= 0x02;                 // SHTR_PULSE_LATCH     = 1
    sim->portc &= ~0x02;                // SHTR_PULSE_LATCH     = 0
    // Write High Byte
    sim->porth = shutter >> 8;
    sim->portc |= 0x08;                 // HIGH/LOW* BYTE       = 1
    sim->portc &= ~0x02;                // SHTR_PULSE_LATCH     = 0
    sim->portc |= 0x02;                 // SHTR_PULSE_LATCH     = 1
    sim->portc &= ~0x02;                // SHTR_PULSE_LATCH     = 0
}
//------------------------------------------------------------
static void SendGain(unsigned short gain)
{
    while (((qsm->spsr & 0x80) == 0) && ((qsm->spcr1 & 0x8000) != 0));
    qsm->tranram[12] = 0x0000 | (gain >> 8);
    qsm->comdram[12] = 0x43;
    qsm->tranram[13] = 0x0100 | (gain & 0x00FF);
    qsm->comdram[13] = 0x43;
    qsm->spcr2 = 0x0D0C;
    qsm->spcr1 |= 0x8000;
    while ((qsm->spsr & 0x80) == 0);
    qsm->spsr &= 0x1F;
    qsm->spcr2 &= 0xFFF0;
}
//------------------------------------------------------------
```

Fig. 10c

```c
#include <stdio.h>
include <math.h> include "sim.h"
include "exposure.h"
#include "global.h"
#include "titler.h"

const unsigned long kNTSCShutterMaxExposure = NTSC_SHUT_MAX_EXPOSURE;
const unsigned long kNTSCSmoothMaxExposure  = NTSC_SMOOTH_MAX_EXPOSURE;
const unsigned long kPALShutterMaxExposure  = PAL_SHUT_MAX_EXPOSURE;
const unsigned long kPALSmoothMaxExposure   = PAL_SMOOTH_MAX_EXPOSURE;

unsigned long gExposure = MAX_EXPOSURE;
void ComputeExposure(void)
{
    unsigned short luma_ratio;
    unsigned short new_ratio;
    unsigned short max_luma_ratio;
    static unsigned short previous_ratio;

if (IsFlagSet(FLAG_FIXED_GAIN))
    {
        gMDACValue   = 0x4FFF;
        gShutterValue = 0;
    }
    else if ((gExposureMode == AUTOSHUTTER) || (gExposureMode == GAINONLY)) {
        if (gLumaAverage == 0) gLumaAverage = 1;
        new_ratio = gLumaSetPoint / gLumaAverage;
        if (new_ratio > 512)
        {
            if (previous_ratio < 512) luma_ratio = 512;
```

Fig. 11a

```
        else if (previous_ratio < new_ratio) luma_ratio = previous_ratio;
        else luma_ratio = new_ratio;
    } else {
        if (previous_ratio > 512) luma_ratio = 512;
        else if (previous_ratio > new_ratio) luma_ratio = previous_ratio;
        else luma_ratio = new_ratio;
    } previous_ratio = new_ratio;
    if (luma_ratio > 522)
    {
        if (luma_ratio > (512 * 2)) luma_ratio = (512 * 2);
        else luma_ratio -= 9;
        if ((gExposureMode == GAINONLY) || (gExposure > 0x00D80000))
        {
            if (gExposure < 0x01000000) max_luma_ratio = 768;
            else max_luma_ratio = 512 + (0xFFFF / ((unsigned short) (gExposure>>16)));
            if (luma_ratio > max_luma_ratio) luma_ratio = max_luma_ratio;
        }
    }
    else if (luma_ratio < 502)
    {
        if (luma_ratio < (512 * 0.5)) luma_ratio = (512 * 0.5);
        else luma_ratio += 9;
    }
    else if (luma_ratio < 508) luma_ratio = 511;
    else if (luma_ratio > 516) luma_ratio = 513;
    else luma_ratio = 512;
    if (luma_ratio != 512)
    {
        if (gExposure > 0x00FFFFFF) gExposure = ((gExposure>>6) * (512 + luma_ratio))>>4;
        else if (gExposure>0x001FFFFF) gExposure = ((gExposure>>3) * (512+luma_ratio))>>7;
        else gExposure = (gExposure * (512 + luma_ratio)) >> 10;
```

Fig. 11b

```c
if (gExposure > MAX_EXPOSURE) gExposure = MAX_EXPOSURE;
else if (gExposure < MIN_EXPOSURE) gExposure = MIN_EXPOSURE;
gMDACValue = ComputeGain(gExposure, gShutterValue);
gShutterValue = ComputeShutter(gExposure);
if (gMDACValue < MIN_GAIN)
{
    asm {
        LDE     gExposure:2
        CLRD
        LSRE
        RORD
        LSRE
        RORD
        LSRE
        RORD
        LDX     gMDACValue
        EDIV
        STX     gExposure:2
    };// gExposure = (((unsigned short) gExposure) * MIN_GAIN) / gMDACValue;
} else {
    asm {
        LDED    gExposure
        LDX     gMDACValue
        EDIV
        XGEX
        CLRD
        LSRE
```

Fig. 11c

```
            RORD
            LSRE
            RORD
            LSRE
            RORD
            STED    gExposure
       };// gExposure = ((unsigned short) (gExposure / gMDACValue)) * MIN_GAIN;
    }
       gMDACValue = MIN_GAIN;
   }
} unsigned short ComputeShutter(unsigned long exposure)
{
   unsigned short ret_val;
   if (gExposureMode == GAINONLY) return 0;
#ifdef MAKE_NTSC
   else if (exposure > NTSC_SHUT_MAX_EXPOSURE) return 0;
   else if (exposure < NTSC_SMOOTH_MIN_EXPOSURE) return 4095;
   else if (exposure > NTSC_SMOOTH_MAX_EXPOSURE)
   {
      asm {
         LDED    kNTSCShutterMaxExposure
         SUBD    exposure:2
         SBCE    exposure
         LDX     #NTSC_SHUT_DIVISOR
         EDIV
         STX     ret_val
```

Fig. 11d

```
        };// return (NTSC_SHUT_MAX_EXPOSURE - exposure) / NTSC_SHUT_DIVISOR;
        if (ret_val > 250) ret_val = 2049;
    } else {
        asm {
            LDED    kNTSCSmoothMaxExposure
            SUBD    exposure:2
            SBCE    exposure
            LDX     #NTSC_SMOOTH_DIVISOR
            EDIV
            AIX     #SMOOTH
            STX     ret_val
        };// return SMOOTH + (NTSC_SMOOTH_MAX_EXPOSURE - exposure) / NTSC_SMOOTH_DIVISOR;
        if (ret_val < 2049) ret_val = 2049;
        else if (ret_val > 4095) ret_val = 4095;
    }
#else
    else if (exposure > PAL_SHUT_MAX_EXPOSURE) return 0;
    else if (exposure < PAL_SMOOTH_MIN_EXPOSURE) return 4095;
    else if (exposure > PAL_SMOOTH_MAX_EXPOSURE)
    {
        asm {
            LDED    kPALShutterMaxExposure
            SUBD    exposure:2
            SBCE    exposure
            LDX     #PAL_SHUT_DIVISOR
            EDIV
            STX     ret_val
        };// return (PAL_SHUT_MAX_EXPOSURE - exposure) / PAL_SHUT_DIVISOR;
        if (ret_val > 300) ret_val = 2049;
    } else {
```

Fig. 11e

```
    asm {
        LDED    kPALSmoothMaxExposure
        SUBD    exposure:2
        SBCE    exposure
        LDX     #PAL_SMOOTH_DIVISOR
        EDIV
        AIX     #SMOOTH
        STX     ret_val
    };// return SMOOTH + (PAL_SMOOTH_MAX_EXPOSURE - exposure) / PAL_SMOOTH_DIVISOR;
    if (ret_val < 2049) ret_val = 2049;
    else if (ret_val > 4095) ret_val = 4095;
#endif
    return ret_val;
} unsigned short ComputeGain(unsigned long exposure, unsigned short shutter)
{
    unsigned short ret_val;
#ifdef MAKE_NTSC
    if (shutter < SMOOTH)
    {
        asm {
            LDD     shutter
            LDE     #NTSC_SHUT_DIVISOR
            EMUL
            ASRE
            RORD
            ASRE
            RORD
```

Fig. 11f

```
        CLRB
        ADE
        XGDE
        XGAB
        NEGD
        ADDD    #NTSC_SHUT_MAX_EXPOSURE_ASR_10
        XGDX
        LDE     exposure
        LDD     exposure:2
        ASLD
        ROLE
        ASLD
        ROLE
        ASLD
        ROLE
        ASLD
        ROLE
        EDIV
        XGDX
        STD     ret_val
    };// return exposure / ((unsigned short) (NTSC_SHUT_MAX_EXPOSURE / NOMINAL_GAIN)
(unsigned short) ((shutter * NTSC_SHUT_DIVISOR) / NOMINAL_GAIN));
    } else {
        asm {
            LDD     shutter
            SUBD    #SMOOTH
            LDE     #NTSC_SMOOTH_DIVISOR
            EMUL
            ASRE
            RORD
```

Fig. 11g

```
            ASRE
            RORD
            ASRE
            RORD
            ASRE
            RORD
            NEGD
            ADDD    #NTSC_SMOOTH_MAX_EXPOSURE_ASR_4
            XGDX
            LDD     exposure:2
            XGAB
            TDE
            LDAA    exposure:1
            XGDE
            CLRB
            ASLD
            ROLE
            ASLD
            ROLE
            SUBD    #NTSC_FUDGE_LOW
            SBCE    #NTSC_FUDGE_HIGH
            EDIV
            XGDX
            STD     ret_val
    };// return exposure / (((unsigned short) (NTSC_SMOOTH_MAX_EXPOSURE / NOMINAL_GAIN)
(unsigned short) (((shutter - SMOOTH) * NTSC_SMOOTH_DIVISOR) / NOMINAL_GAIN));
   }
#else
```

Fig. 11h

```
if (shutter < SMOOTH)
{
    asm {
        LDD     shutter
        LDE     #PAL_SHUT_DIVISOR
        EMUL
        ASRE
        RORD
        ASRE
        RORD
        CLRB
        ADE
        XGDE
        XGAB
        NEGD
        ADDD    #PAL_SHUT_MAX_EXPOSURE_ASR_10
        XGDX
        LDE     exposure
        LDD     exposure:2
        ASLD
        ROLE
        ASLD
        ROLE
        ASLD
        ROLE
        EDIV
        XGDX
```

Fig. 11i

```
            STD     ret_val
    };// return exposure / ((unsigned short) (PAL_SHUT_MAX_EXPOSURE / NOMINAL_GAIN)
(unsigned short) ((shutter * PAL_SHUT_DIVISOR) / NOMINAL_GAIN));
    } else {
        asm {
            LDD     shutter
            SUBD    #SMOOTH
            LDE     #PAL_SMOOTH_DIVISOR
            EMUL
            ASRE
            RORD
            ASRE
            RORD
            ASRE
            RORD
            ASRE
            RORD
            NEGD
            ADDD    #PAL_SMOOTH_MAX_EXPOSURE_ASR_4
            XGDX
            LDD     exposure:2
            XGAB
            TDE
            LDAA    exposure:1
            XGDE
            CLRB
            ASLD
            ROLE
            ASLD
```

Fig. 11j

```
        ROLE
        SUBD    #PAL_FUDGE_LOW
        SBCE    #PAL_FUDGE_HIGH
        EDIV
        XGDX
        STD     ret_val
    };// return exposure / ((unsigned short) (PAL_SMOOTH_MAX_EXPOSURE / NOMINAL_GAIN)
(unsigned short) (((shutter - SMOOTH) * PAL_SMOOTH_DIVISOR) / NOMINAL_GAIN));
    }
#endif
    return ret_val;
}
```

Fig. 11k

```
#ifndef EXPOSURE_H
define EXPOSURE_H define SMOOTH                          2048            // Values above this indicate Smooth Shutter
define MAX_EXPOSURE                    0x03FFFFFF      //   (Shutter = 0, Gain = 65535)
#define MIN_EXPOSURE                    0x3800          //   Guaranteed Less than (Shutter = 4095, Gain = 8192)
#define MIN_GAIN                        0x2000          //   Gain cannot go lower than this value
define NOMINAL_GAIN                    0x4000          //   Gain value we are setting the shutter based on define NTSC_SMOOTH_DIVISOR             0x0119          // Pixel
define NTSC_SHUT_DIVISOR               0xFA8A          // H = 227.5 * Pixel
#define NTSC_SHUT_MAX_EXPOSURE          0x01000000      // 261.5775 H
#define NTSC_SHUT_MAX_EXPOSURE_ASR_10   0x4000          // 261.5775 H
#define NTSC_SMOOTH_MAX_EXPOSURE        0x000A5A1B      // 10.5775 H
#define NTSC_SMOOTH_MAX_EXPOSURE_ASR_4  0xA5A2          // 10.5775 H
#define NTSC_SMOOTH_MIN_EXPOSURE        0x000018BC9     // Shutter 4095
#define NTSC_FUDGE_LOW                  0x5AAA          // Shutter to Smooth Fudge Factor
define NTSC_FUDGE_HIGH                 0x000C define PAL_SMOOTH_DIVISOR              0x00ED          // Pixel
define PAL_SHUT_DIVISOR                0xD250          // H = 227 * Pixel
#define PAL_SHUT_MAX_EXPOSURE           0x01000000      // 311.61 H
#define PAL_SHUT_MAX_EXPOSURE_ASR_10    0x4000          // 311.61 H
#define PAL_SMOOTH_MAX_EXPOSURE         0x0008B76F      // 10.61 H
#define PAL_SMOOTH_MAX_EXPOSURE_ASR_4   0x8B77          // 10.61 H
#define PAL_SMOOTH_MIN_EXPOSURE         0x1505C         // Shutter = 4095
#define PAL_FUDGE_LOW                   0x4000          // Shutter to Smooth Fudge Factor
define PAL_FUDGE_HIGH                  0x0008 void ComputeExposure(void);
unsigned short ComputeShutter(unsigned long exposure);
unsigned short ComputeGain(unsigned long exposure, unsigned short shutter);

#endif // EXPOSURE_H
```

Fig. 12

AUTOMATIC EXPOSURE CONTROL SYSTEM AND METHOD

BACKGROUND OF THE INVENTION

1. Field of the Invention

The field of invention relates generally to exposure control systems for imaging devices, and more specifically, exposure control systems of the type in which there is a need for a rapid and smooth response to exposure control commands.

2. Background of the Invention

In recent years, the need for miniature lightweight video cameras in the medical and industrial fields has developed. These cameras typically comprise a camera head containing an imaging device, such as a charged coupled device (CCD), a light source, a camera control unit containing control and video processing circuitry, and a display device, such as a computer monitor, television screen, or a microscope. The camera head is attached to the camera control unit via a cable or through a wireless interface, thereby allowing the camera head to be inserted into and positioned at remote and/or confined locations. Once the camera head is positioned, light from the light source is used to illuminate the location of interest, typically after passage through the cable or wireless interface. The light reflects off the location of interest to form images of the desired location. The images are captured by the imaging device in the camera head, and then displayed on the display device.

A medical application for such video cameras is endoscopy, in which an endoscope is passed through a small incision in the patient to permit viewing of the surgical sight. The endoscope is optically coupled to the camera head. Images of the surgical site are captured by the imaging device in the camera head, and displayed on the display device. Advantageously, the endoscope allows substantially non-invasive viewing of the surgical site.

Likewise, numerous industrial applications exist for video cameras such as this. In one such application, a video camera in combination with other tools allow work to be performed on areas that would otherwise not permit access. Examples include the use of miniature video cameras to view inaccessible piping networks situated behind drywalls and the like, interior locations on industrial equipment, and underwater locations in sunken ships or the like inaccessible by divers.

Additional details on endoscopic video cameras are contained in U.S. Pat. Nos. 5,841,491; 5,696,553; 5,587,736; 5,428,386; and co-pending U.S. patent application Ser. Nos. 09/044,094; 08/606,220; and 08/589,875; each of which is owned by the assignee of the subject application, and each of which is hereby fully incorporated by reference herein as though set forth in full.

A characteristic of many of these applications is a diverse and rapidly changing scene of interest. In endoscopic applications, for example, as the surgeon manipulates the endoscope, the scene of interest may rapidly change to encompass one or more bodily fluids or structures, including blood, which is light absorptive, moist tissue, which is light reflective, and other diverse body structures such as cartilage, joints, and body organs. The bright light sources typically used in such applications, coupled with the diverse and rapidly changing reflective characteristics of elements within the field of view, give rise to an illumination level of reflected light which changes rapidly and over a broad range.

The result is that image capture devices such as the CCD can easily become saturated and over-exposed. Exposure control systems are thus needed to avoid saturation of the image capture device, to avoid overexposure and underexposure conditions, to deal with the diverse and rapidly changing reflection characteristics of the elements in the scene of interest, and also to ensure that the image capture device and related components are operating in optimal or preferred ranges.

Unfortunately, current exposure control systems react too slowly to the changing reflection characteristics, and develop unstable brightness fluctuations or oscillation if configured to run more quickly. It is not uncommon for these systems to take up to several seconds to react to overexposure and underexposure conditions during which the image is lost, and the scene is unviewable. This image loss makes these current systems unsuitable for endoscopic applications, in which any image loss poses an unacceptable health risk to the patient given that power tools, sharp surgical instruments, and electrosurgical devices can quickly damage healthy tissue if they are not continuously in view and controllable by the surgeon. Similar concerns are present in industrial applications in which the power tools utilized by the industrial operator may quickly damage the industrial work site.

The problem is compounded due to the nature of current image capture devices, such as CCDs, in which there is an inherent delay between the detection of a condition requiring a change in the exposure level of the device, and the responsiveness of the device to such a command. The problem can be explained with reference to FIG. 1, which illustrates a video camera system in which the image capture device is a CCD. The imaging system comprises sensor array 5 readout register 6, amplifier 7, video display device 8, and control device 1. Together, the sensor array 5 and readout register 6 comprise CCD or image sensor 9.

The sensor array 5 comprises a plurality of individual photo sites 14 typically arranged in rows and columns. Each site is configured to build up an accumulation of charge responsive to the incidence of illumination on the site. The geometry is such that the spatial distribution of charge build-up in the individual sites matches the spatial distribution of the intensity of light reflected from the scene of interest and defining the scene image. An image is captured when the charge is allowed to build up in the individual sites in the same spatial orientation as the spatial orientation of the reflected light defining the image.

Periodically, the accumulated charge in the individual sites is removed, and stored in readout register 6. Then, the contents of the readout register 6 are serially output onto signal line 15 in a manner which is consistent with the protocol of display device 8. The signal on signal line 15 is then provided as an input to display device 8. The output on signal line 15 comprises the output of image sensor 9.

In one implementation, a video frame must be presented to the display device 8 once every ⅟₆₀ seconds, or 16.67 milliseconds (mS). A video frame in this implementation consists of 262.5 lines of pixels, with a line being presented every 63.6 $\mu$S. According to this implementation, the accumulated charge in the individual sites 14 of sensor array 5 are removed to readout register 6, and the contents of the readout register 6 serially output on serial line 15, once every ⅟₆₀ seconds.

Control device 1 controls the time period during which the individual sites 14 in sensor array 5 are allowed to accumulate charge during a frame. In one implementation, this is accomplished as follows. Control device 1 determines a control parameter equal to the number N of lines in a frame that the individual sites are to be kept in a discharged state. It then sends over control line 2 a plurality of discharge pulses in which the number of pulses is N, and the duration of the pulses is N×63.6 $\mu$S. The remaining portion of the frame, known as the integration time or integration time period, is the time period over which the individual sites are allowed to accumulate charge. Since the frame time is 16.67 mS, and the time per line is 63.6 $\mu$S, the integration time in milliseconds per frame is 16.67−N×63.6×10$^{-3}$.

The situation is illustrated in FIG. 2. FIG. 2(a) illustrates a timing pulse which, in accordance with the NTSC standard, occurs every 1/60 sec., in which each occurrence of the pulse defines a separate frame capture. These timing pulses define separate frame periods. Indicated in the figure is the capture of frames 1, 2, and 3. FIG. 2(b) illustrates the discharge pulses which are sent to the sensor array 5 by control device 1 over control line 2. As indicated, for frame 1, N1 discharge pulses are sent; for frame 2, N2 discharge pulses are sent; and for frame 3, N3 discharge pulses are sent. Also indicated are the integration times for each frame. For frame 1, the integration time is $\tau_1$; for frame 2, the integration time is $\tau_2$; and for frame 3, the integration time is $\tau_3$. Although the frame periods are shown as adjacent to one another, in practice, as one of skill in the art would appreciate, the frame periods are separated by intervening vertical blanking intervals (not shown in FIG. 2).

FIG. 2(c) illustrates the average charge build-up in the individual sites for each frame, that is, the charge build-up for a site averaged over all or substantially all of the individual sites or pixels. As indicated, for frame 1, the average charge build-up is $Q(\tau_1)$; for frame 2, the average charge build-up is $Q(\tau_2)$; and for frame 3, the average charge build-up is $Q(\tau_3)$.

FIG. 2(d) illustrates a signal representative of the average intensity of the frames displayed on display device 8. The average intensity of the first frame is related to $Q(\tau_1)$; that of the second frame is related to $Q(\tau_2)$; and that of the third frame is related to $Q(\tau_3)$.

As can be seen by comparing FIGS. 2(a) and 2(d), there is a frame period delay, which in this implementation, is a 1/60 sec. time period delay, between the time a frame is captured and the time the frame is displayed. Consequently, there will be a two frame delay between the time a condition is detected warranting a change in the CCD integration time, such as an overexposure or underexposure condition, and the time a frame reflecting the changed integration time is displayed. To see this, consider a first frame period in which the control unit 1 detects an overexposure or underexposure condition, or a changing intensity scene warranting a change in the CCD integration time. Since frame capture may have already begun during the first frame period, the earliest that a command can be effective to change the integration time is the next successive frame period. Moreover, because there is a frame period delay between the time a frame is captured, and the time the frame is displayed, there will be another frame period delay before the frame reflecting the changed integration time can be displayed. The end result is a two frame period delay. This delay compounds the difficulty of rapidly responding to overexposure or underexposure conditions, or a changing intensity scene.

In U.S. Pat. No. 5,162,913, Chatnever, et al., entitled "Apparatus for Modulating the Output of a CCD Camera," a method and apparatus for automatic exposure control is proposed in which a trial adjustment to the gain of an amplifier coupled to the output of the CCD is determined. This trial adjustment attempts to move the intensity of image represented by the signal output from the amplifier to an ideal value. Before, however, the trial adjustment is implemented, it is compared with the optimal range of the amplifier, in one implementation, 0–6 dB. If the trial adjustment exceeds the optimal range of the amplifier, it and the CCD integration time are adjusted or readjusted in opposite directions to allow the amplifier to operate within its optimum range. When the adjustment to the CCD integration time is reflected in the output of the amplifier, the trial adjustment is made to the amplifier gain.

The problem with this approach is that the adjustment to the amplifier gain must be deferred for two frames until a frame reflecting the corresponding integration time is displayed. The result is that the condition warranting a change in intensity level is allowed to continue into the next frame. The camera is thus unable to quickly and smoothly respond to scene and illumination changes.

Therefore, there is a need for an exposure control apparatus and method that, compared to current approaches, more rapidly responds to conditions warranting a change in exposure level.

There is also a need for an exposure control apparatus and method that, compared to current approaches, more smoothly responds to conditions warranting a change in exposure level.

There is also a need for an exposure control apparatus and method that overcomes the disadvantages of the prior art.

The objects of the subject invention include fulfillment or achievement of any of the foregoing objects, alone or in combination. Additional objects and advantages will be set forth in the description which follows, or will be apparent to those of ordinary skill in the art who practice this invention.

SUMMARY OF THE INVENTION

The present invention comprises a method and apparatus for automatic exposure control of an imaging device. In one embodiment, a device configured in accordance with the subject invention is configured to measure a brightness parameter of an image, and, based thereon, adjust the imaging device integration time and amplifier gain to bring the brightness parameter to a desired level. Unlike current approaches, the adjustment to amplifier gain is not deferred until the corresponding adjustment to integration time is reflected in the output of the amplifier. The result is a more rapid and smooth response to exposure control commands.

In one embodiment, during or upon completion of a first frame period, the desired effective exposure is derived from the measured brightness parameter in relation to a desired effective exposure. In one implementation, the brightness parameter is average luminance of the image represented by the signal output from the amplifier, but brightness parameters relating to peak luminance, or peak or average chrominance, are also expressly contemplated. The desired effective exposure is a composite measure of the effective exposure of the imaging device which is needed to bring the measured brightness parameter in line with a desired brightness parameter. It relates both to the integration time of the image sensor, and the gain of the amplifier coupled to the output of the sensor. It reflects the fact that adjustments to either can impact the brightness parameter of the signal output from the amplifier. More specifically, it reflects the fact that the brightness parameter of the amplifier output can be increased through an increase in the amplifier gain or the integration time of the image sensor, and that an increase in one or the other of these two values can be offset by a decrease in the other. In one implementation, the desired effective exposure is derived from the product of the gain of the amplifier and the integration time of the image sensor.

In one implementation, a brightness parameter ratio is derived from the ratio of the desired brightness parameter to the measured brightness parameter. Optionally, the ratio is subject to further processing, such as filtering, clipping, and/or hysteresis processing steps designed to remove high frequency noise, prevent large and rapid changes to the ratio, and avoid minute changes to the ratio which could cause undesirable hunting behavior and oscillations.

According to this implementation, the desired effective exposure is derived from the product of the brightness parameter ratio (after the optional processing described above) and the desired effective exposure of a second previous frame. In one implementation example, the first and second frames are successive frames such that the second frame directly or immediately precedes the first frame.

In one embodiment, during the first frame period, the amplifier gain determined in or upon completion of the second previous frame is applied by the amplifier to the output of the image sensor, and the integration time period determined in or upon completion of the second previous frame period is applied to image capture. In this embodiment, during or upon completion of the first frame period, the gain and integration time to be applied in a subsequent third frame period are also determined. In one implementation, the gain to be applied in the third subsequent period is derived from the ratio of the desired effective exposure determined in or upon completion of the first period to the integration time period applied to image capture in the first frame period. Also in this implementation, the integration time to be applied to image capture in the third frame period is derived from the ratio of the desired effective exposure determined in or upon completion of the first frame period to a nominal gain determined so that the amplifier is allowed to operate in a desired region of operation. In one implementation, the nominal gain is determined to minimize the introduction of noise into the signal output from the amplifier, while, at the same time, achieving acceptable operation under low light level conditions. In one implementation example, the first and third frame periods are successive frame periods such that the third frame period is the immediate or direct successor to the first frame period, with an intervening vertical blanking interval.

If necessary, the gain and integration time to be applied in the third period are then stored. Upon the occurrence of the third period, the gain is retrieved and applied by the amplifier to the output of the image sensor in the manner previously discussed. In addition, the integration time period is retrieved and applied to image capture in the manner previously discussed. The foregoing process then repeats itself. In one implementation, this process occurs every or substantially every frame period.

In the foregoing embodiment, since the adjustment to amplifier gain is not deferred until the corresponding adjustment to integration time is reflected in the output of the amplifier, a more rapid and smooth response to a condition requiring a change in desired effective exposure can be achieved compared to current approaches, such as that described in U.S. Pat. No. 5,162,913. If the gain adjustment causes the amplifier to operate outside a desirable range of operation, this condition is short-lived and is eliminated when the adjustment to integration time is reflected in the output of the amplifier. At that point, the amplifier gain can be returned to a nominal value selected to permit the amplifier to operate in a desired region of operation.

In one implementation, the gain and integration time period adjustments are determined and controlled by a processor, such as a microcomputer, microprocessor, or digital signal processor, configured to execute software code embodying the subject invention stored in a computer readable medium such as memory accessible by the processor. In another implementation, the gain and time period adjustments are determined and controlled by analog circuitry configured in accordance with the subject invention. In one implementation example, the analog circuitry comprises a brightness parameter module for determining the brightness parameter ratio; a desired effective exposure module for determining the desired effective exposure responsive to the brightness parameter ratio after optional filtering, clipping, and hysteresis processing steps; an integration time module for determining the integration time period for image capture; and a gain module for determining amplifier gain responsive to the integration time period determined in a previous frame.

Related systems, apparatus, computer readable media, and methods are also provided.

It is contemplated that the subject invention can be beneficially employed in any application in which the need to rapidly and smoothly adjust the exposure of a video camera is desirable. Examples of these various applications include but are not limited to medical endoscopy, underwater remote imaging devices, military or law enforcement video systems, and night vision systems.

Other applications, and other advantages of the present invention, will be apparent after reading the detailed description that follows.

BRIEF DESCRIPTION OF THE DRAWINGS

FIG. 8 is a table illustrating the inputs and outputs of various modules in a second embodiment of the subject invention.

FIGS. 10(a)–10(c), 11(a)–11(k), and 12 are listings of software code embodying one implementation example of the subject invention.

DETAILED DESCRIPTION OF THE PREFERRED EMBODIMENTS

1. Overview of the Invention

Figure 1:
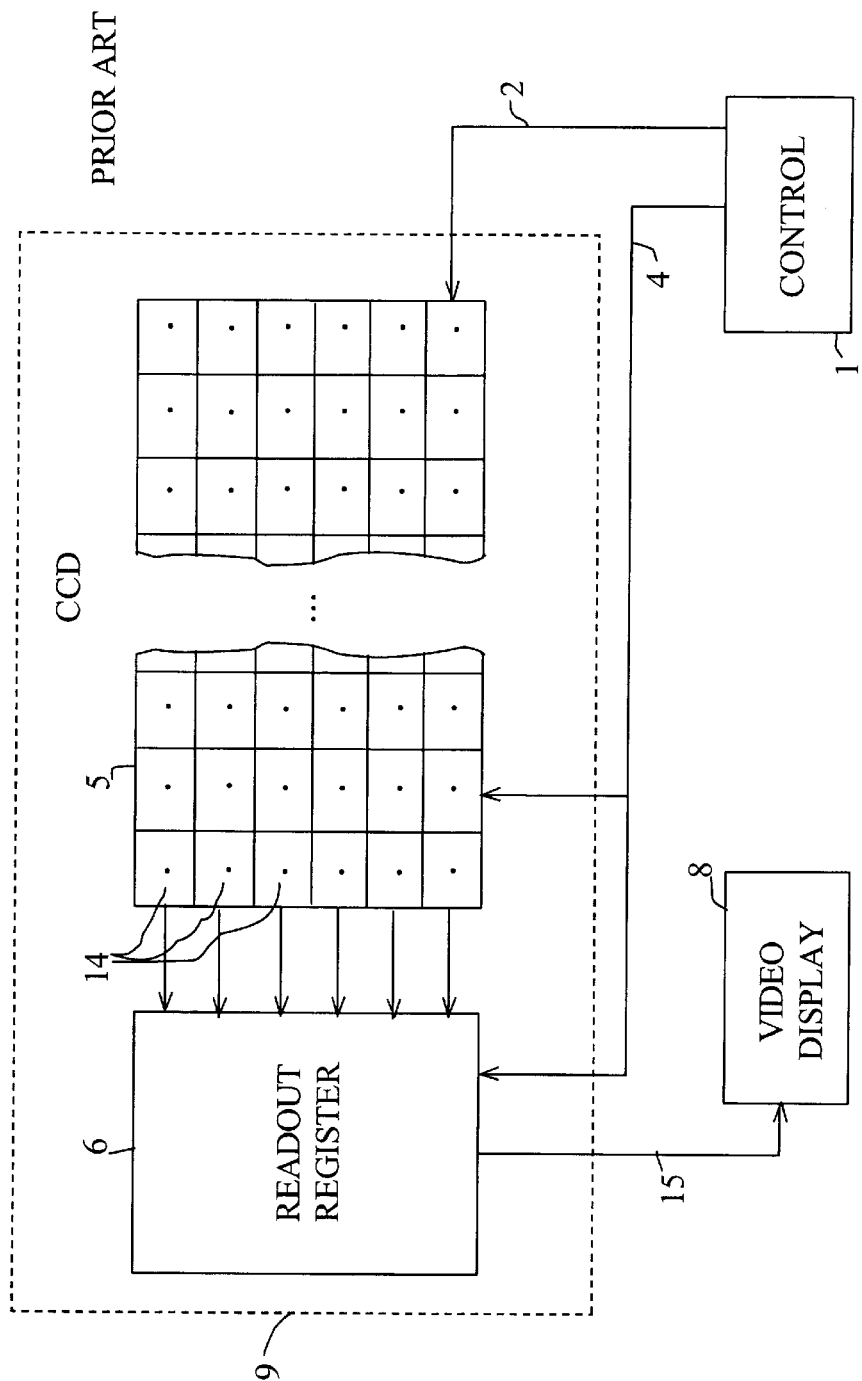
FIG. 1 illustrates the components of a current image display system.
Figure 2:
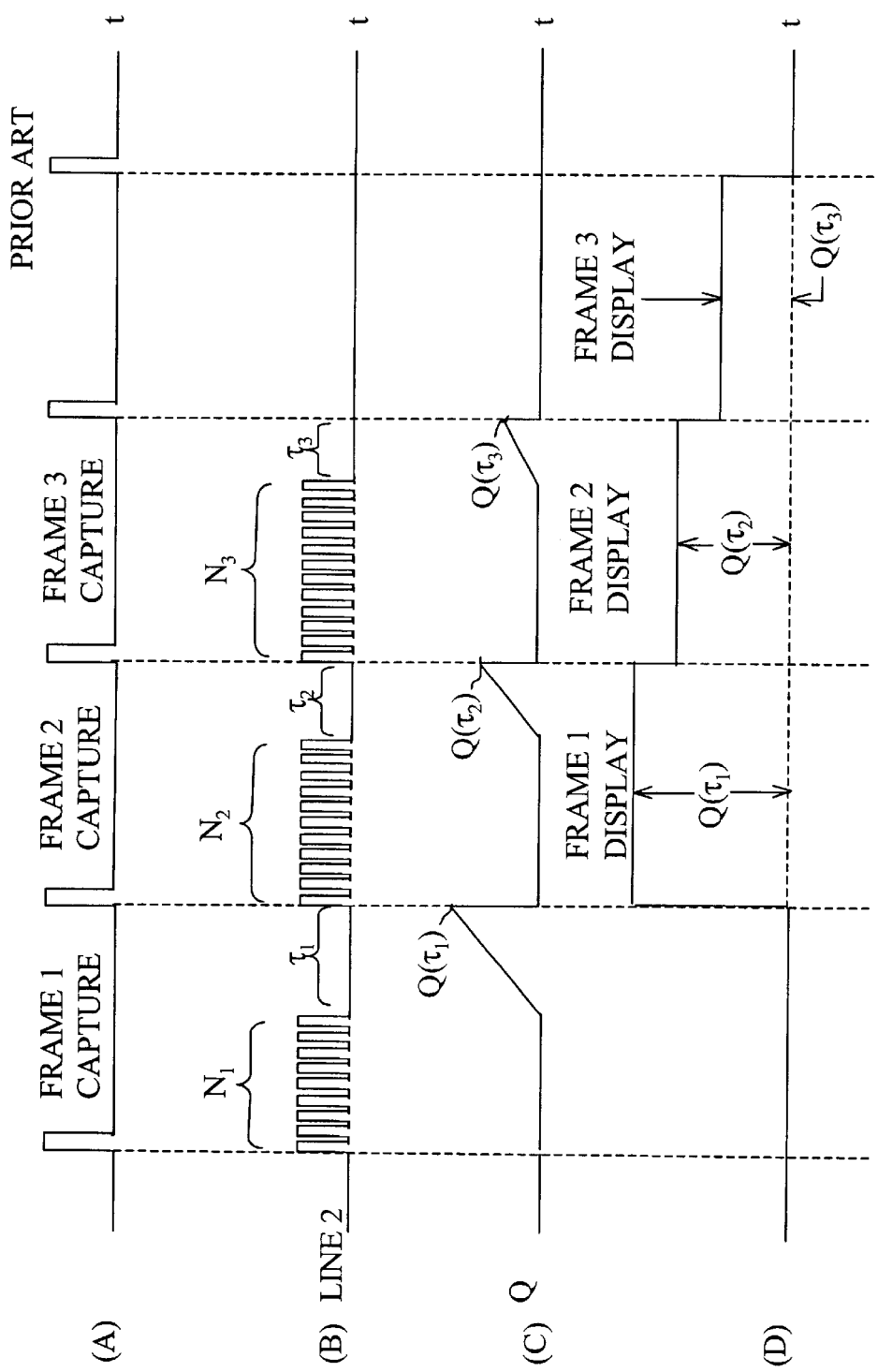
FIGS. 2(a)–2(d) illustrate the relative timing between image capture and image display in such a system.

The present invention is directed to an apparatus and method for automatically controlling exposure of a video camera system such as that illustrated in FIG. 1. In detail, one aspect of the invention comprises an exposure subsystem tailored to monitor a brightness parameter at the output of the image sensor and rapidly adjust the gain applied to the image signal at the output of the image sensor, and the integration time period applied by the image sensor to image capture, to move the brightness parameter at the output of the image sensor in line with a desired level. Even if there is a delay in the time the adjustment to integration time period can be reflected in the output of the image sensor, the adjustment in gain can be immediately applied to the output of the image sensor. If the gain adjustment leads to the introduction of undesirable noise into the displayed image, the problem will typically be very short-lived and last only until the adjustment to the integration time period is reflected in the output of the image sensor. At that point, the gain can likely be returned to a nominal level which allows for more desirable operation of the system in terms of noise avoidance.

Although FIG. 1 illustrates a video camera system in which the image capture device thereof is a solid state imager such as a CCD, it should be appreciated that the subject invention is also applicable to video camera systems in which the image capture device thereof is an electro-mechanical device such as an electro-mechanical shutter or iris. In general, it is contemplated that the subject invention could be beneficially employed in relation to any image sensor in which there is a delay between an exposure control command and the time that an image reflecting this command is displayed.

2. Example Environments

Figure 3:
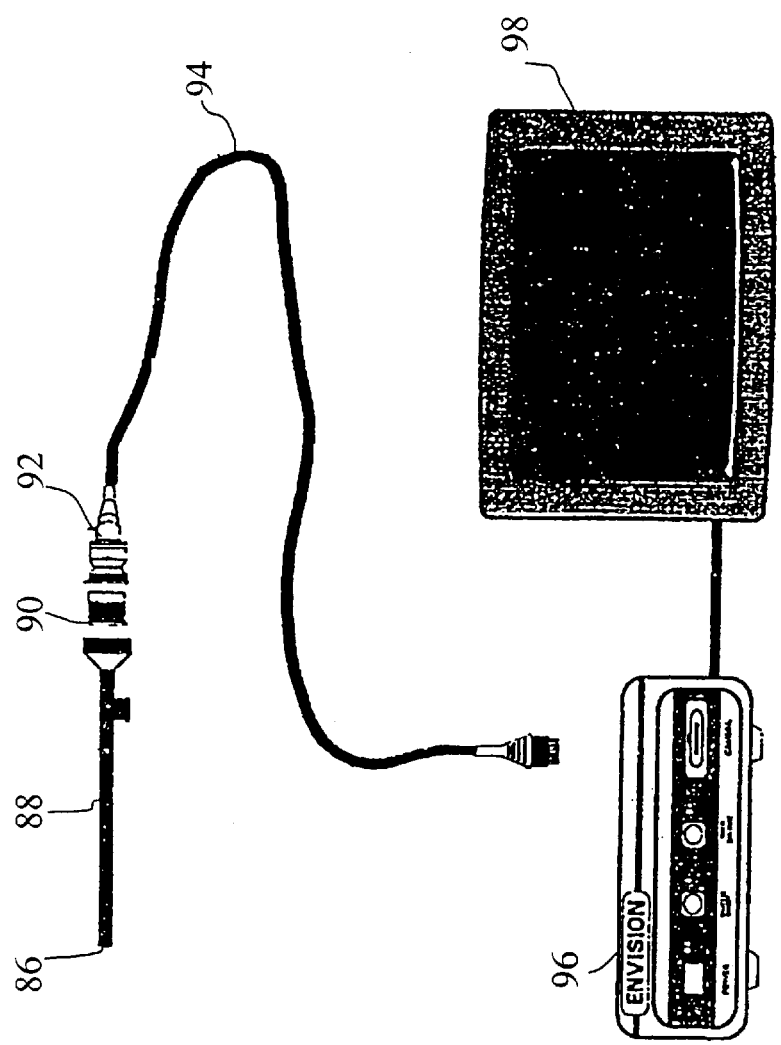
FIG. 3 illustrates a typical video camera system for use in endoscopy.

An example environment in which the automatic exposure system of the present invention can be beneficially employed is a video camera system of the type used in medical endoscopy. FIG. 3 illustrates an example of such a video camera system. As shown, a camera control unit 96 is coupled to a camera head 92 by means of cable 94. Camera head 92 in turn is coupled to endoscope 88 by an optical coupler 90. The distal end 86 receives and conducts images to the camera head 92. The video signals produced ultimately appear as a video display on monitor 98. To maintain a tight seal, the cable 94 may be permanently attached to camera head 92, thereby protecting the components contained therein from contaminants. Alternatively, the cable 94 may be removably attached to the camera head 92. Additional details on endoscopic video cameras are contained in U.S. Pat. Nos. 5,841,491; 5,696,553; 5,587,736; 5,428,386; and co-pending U.S. patent application Ser. Nos. 09/044,094; 08/606,220; and 08/589,875; previously incorporated herein by reference.

Another example environment in which the subject invention can be beneficially employed is a video camera system for industrial applications, such as underwater welding or precision work in chemical laden environments.

Yet another example environment is a video camera system for military or law enforcement applications, such as night vision or remote surveillance video systems as incorporated in night vision goggles or flight helmets.

A common characteristic of the foregoing applications and environments is a diverse and changing scene of interest, resulting in images having rapidly changing intensity levels, coupled with the need for substantially continuous viewing, or a situation in which even a momentary loss of vision would be undesirable.

Other environments and applications will be apparent to those of skill in the art from a review of the subject disclosure.

A. First Embodiment

Figure 4:
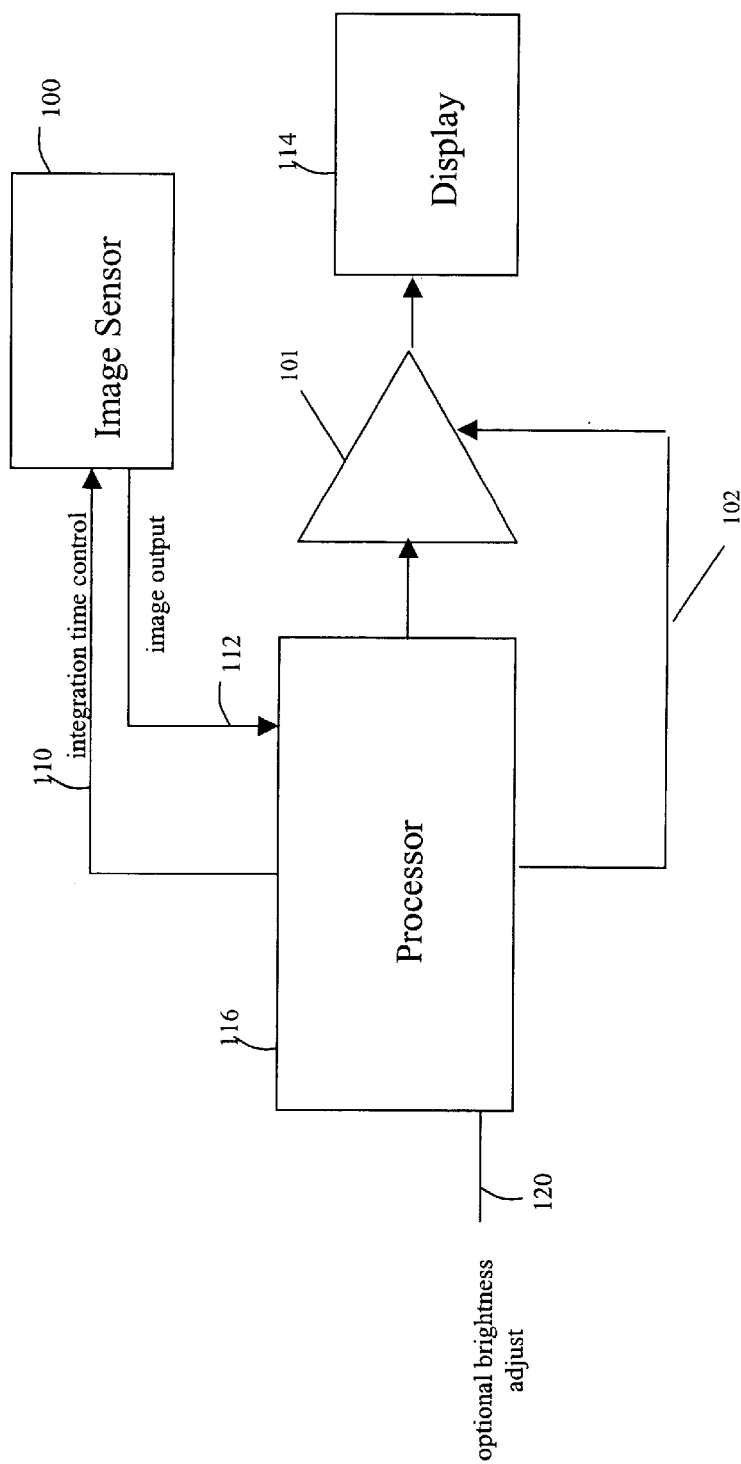
FIG. 4 is a block diagram of a first embodiment of the subject invention.

FIG. 4 illustrates a block diagram of a first embodiment of the subject invention. As shown, the apparatus comprises image sensor 100, display unit 114, video camera circuitry and exposure control processor 116, and amplifier 101.

Image Sensor

The image sensor 100 comprises a device configured to electronically capture one or more images at a time, and convert those recorded images into a electrical output on a line 112. For purposes of this disclosure, the term "image sensor" is defined to include solid state imagers, such as charge coupled devices (CCD), CMOS imagers, as well as electro-mechanical devices such as shutters or irises. In one implementation, the image sensor comprises a Sony ICX 038 DNB CCD having about 400,000 individual pixels or light sensitive elements. The image sensor includes an output line 112 and integration time control line 110, both of which are coupled to a processor 116. The integration time control input 110 transfers integration time period signals from the processor 116 to the image sensor 100. In the case of an image sensor of the CCD-type, the integration time period is the amount of time light is allowed to impinge upon the individual sensors in the sensor array, and thus the amount of charge which is allowed to accumulate in these individual pixel sites during a frame period. In the case of an electromechanical shutter or iris, the integration time is the amount of time in a frame period the shutter or iris is kept open. Although phrases such as "shutter period" are sometimes used to describe this concept in relation to electro-mechanical devices such as a shutter or iris, it is intended for purposes of this disclosure that the phrase "integration time" be generic to and include within its scope these other phrases.

After an image has been captured by the image sensor, an image signal representing this image is sent to the processor 116.

Color Images

The subject invention is useful in conjunction with either black & white or color video camera systems. In the case of a video camera system employing a CCD as the image capture device, color images are achieved most often in one of two ways.

According to a first method, filters are placed over portions of the CCD. The filters are configured to allow light of red, green, and blue wavelengths to strike different portions of the face of the CCD. An output signal is provided having three components, representing, respectively, the red, green and blue components of the incident light. These components may be output directly to an RGB compatible display monitor or may be mapped into the Y-C components of a composite video signal.

According to the second method, a video camera is configured with three CCDs, with each receiving one color from the image. The image is split into its color components, with each being directed to a corresponding CCD by a prism. This method provides an image signal of higher resolution. In one embodiment, the image signal is divided into RGB components and processed accordingly.

To obtain the luminance level of an image in a black & white system, the difference in amplitude between the base reference voltage and the voltage representative of the luminance of the image is determined and averaged over substantially all or a selected area of the image. A similar process occurs in the color system with the three luminance levels of the red, green and blue signals being averaged.

Display

The display 114 receives an output from the amplifier 101. As known by those of skill in the art, the display is configured to accept an electrical signal representing an image, and display that image on a screen or other such apparatus. The display 114 may comprise a CRT monitor, flat screen display, electronic screen microscope viewer, or other suitable device capable of providing the image to one or more viewers.

Video Camera Circuitry and Exposure Control Processor

The video camera circuitry and exposure control processor 116 is a device capable of executing code comprising a sequence of software instructions stored in computer readable media such as a memory accessible by the processor. In one implementation example, the processor comprises a Motorola MC 68HC916 microcontroller. Of course, numerous other processors may be utilized to achieve the processing functions as required. It is anticipated that the video camera circuitry and processor 116 may include a microcontroller, which typically includes internal memory for the storage of code, a microprocessor, which typically lacks internal memory for the storage of code, a digital signal processor, or the like. The circuitry/processor 116 is configured to receive input from the image sensor via line 112 and process the received image signal in accordance with the present invention. The circuitry/processor 116 calculates an integration time period control signal which is presented to the image sensor 100 over line 110. The image signal is transferred over a signal line to amplifier 101.

The amplifier 101 is configured to amplify the signal at a variable gain controlled by circuitry/processor 116 over signal line 102. The amplified signal is then provided to display 114.

An optional input to the circuitry/processor 116 is a desired brightness parameter provided on brightness adjustment line 120. This line provides the means for a user to externally adjust a brightness parameter, such as the magnitude of the luminance component, of the signal provided to the display 114.

Operation of the system shown in FIG. 4 begins by positioning the image sensor 100 to capture an image. Once an image is captured, the image sensor then converts the image to an electrical signal, which is transferred over signal line 112 to the circuitry/processor 116. In or upon completion of a first frame period, the circuitry/processor 116 measures a brightness parameter of the signal output on signal line 118, and responsive thereto, determines an integration time and a gain to move the measured brightness parameter in line with the desired value Upon calculation of the integration time period and gain, the circuitry/processor 116, in a third subsequent frame period, directs the amplifier to amplify the image signal in accordance with the gain which has been determined. In addition, in the third subsequent frame period, the circuitry/processor 116 outputs a signal on signal line 110 to direct the image sensor to capture an image using the integration time period which has been calculated.

In one implementation, the circuitry/processor is configured, in the first frame period, to apply to the signal on signal line 118 the gain determined in or upon completion of a second previous frame period. In addition, the circuitry/processor is also configured to apply to signal line 110 a control signal directing the image sensor 100 to capture an image using the integration time period determined in or upon completion of the second previous frame period. In one implementation example, the first, second, and third periods are successive frame periods, with the second period directly preceding the first period, and the third period directly succeeding the first period, with intervening vertical blanking intervals separating the frame periods. In this implementation example, the measurement of the brightness parameter, the determination of the desired effective exposure, and the calculation of the gain and integration time adjustments are performed during the vertical blanking interval separating the frame periods. In another implementation example, at least one frame period separates the first and second periods, and the first and third periods. In a third implementation example, the first, second and third periods are time periods not necessarily linked to frame periods.

The circuitry/processor is further configured, in or upon completion of the first frame period, to measure a brightness parameter, such as average or peak brightness, of the image represented by the signal on signal line 118, and form a brightness parameter ratio derived from the ratio of the desired level of the brightness parameter, as obtained over signal line 120, to the measured level.

The circuitry/processor is also configured to track a parameter known as effective exposure. In one implementation, the effective exposure is derived from the gain applied to an image and the integration time period employed to capture the image. In one implementation example, the effective exposure is derived from the product of the gain applied to an image and the integration time period applied to capture an image. In this implementation example, the desired effective exposure is the effective exposure which is required to bring the measured brightness parameter in line with the desired brightness parameter. A characteristic of effective exposure is that it can be adjusted, either upwards or downwards, by a corresponding adjustment to either the gain applied to the output of the image sensor or the integration time period applied to image capture. Another characteristic is that an increase in one or the other of gain and integration time can be effectively offset by a corresponding decrease in the other.

The circuitry/processor is also configured, in or upon completion of the first frame period, to compute a desired effective exposure. In one implementation, the desired effective exposure is derived from the product of the brightness parameter ratio determined in or upon the completion of (and thus associated with) the first frame period and the desired effective exposure of the second previous frame period.

The circuitry/processor is configured to determine, in or upon completion of the first frame period, the gain and integration time period needed to bring the measured brightness parameter in line with the desired level of the brightness parameter. In one implementation, the necessary gain is derived from the ratio of the desired effective exposure as determined in or upon completion of the first frame period and the integration time period applied to image capture in the first frame period. In this implementation, the necessary integration time is derived from the ratio of the desired effective exposure as determined in or upon completion of the first frame period and a nominal gain determined so that noise avoidance is at a desirable level. If necessary, the circuitry/processor is configured to store the gain and integration time periods as determined above for use in the third subsequent frame period. The circuitry/processor is configured, in the third subsequent frame period, to amplify the signal on signal line 118 in accordance with the gain determined in or upon completion of the first frame period, and also to direct the image sensor, in the third frame period, to conduct image capture at the integration time period determined in or upon completion of the first frame period. In one implementation, the first and second frame periods are successive frame periods, with the second period preceding the first, and the first and third frame periods are successive frame periods, with the first period preceding the third, with intervening vertical blanking intervals separating the frame periods.

Figure 5:
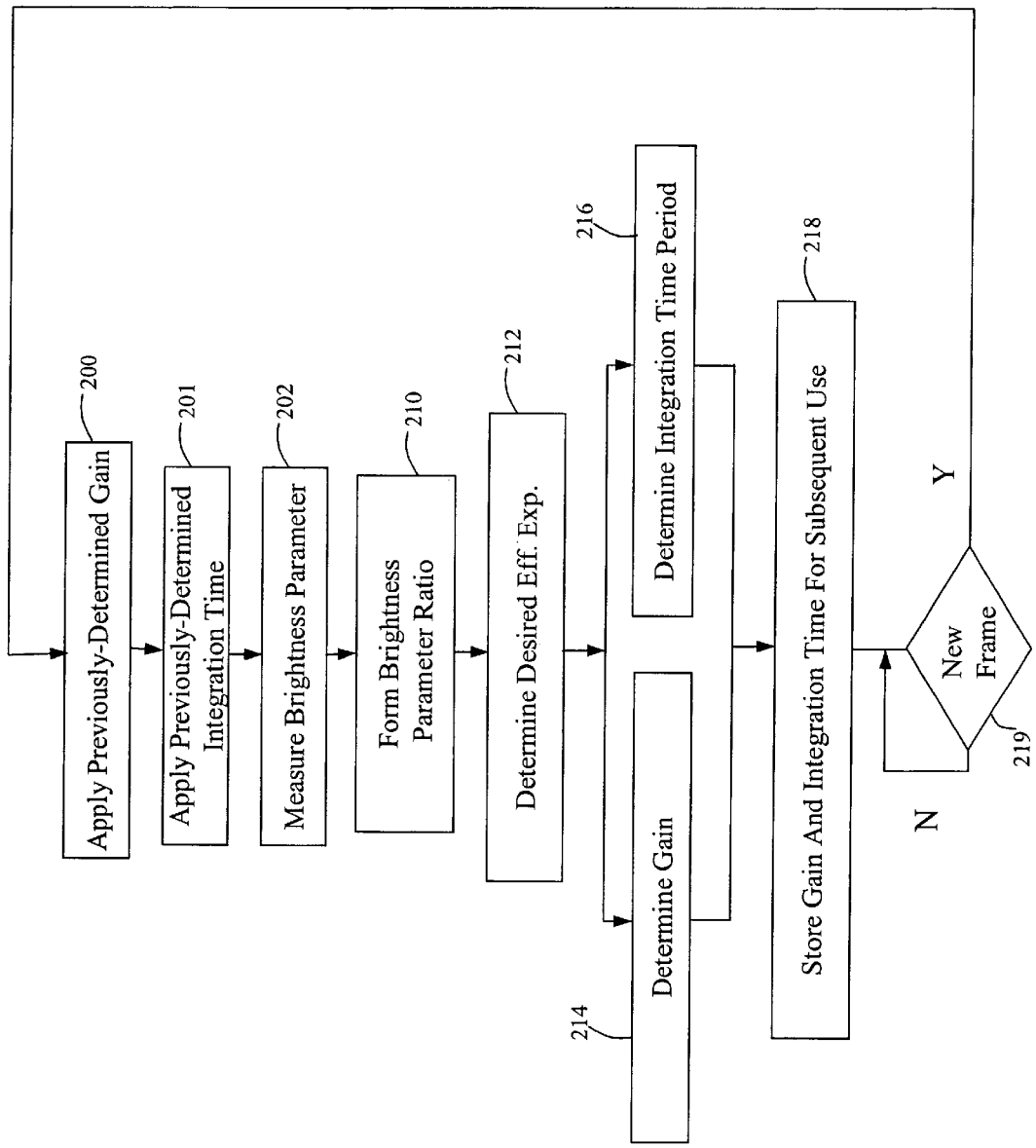
FIG. 5 is a flowchart of a first embodiment of a method of operation of the subject invention.

With reference to FIG. 5, a first embodiment of a method of operation of the subject invention is illustrated. In one implementation, this method is embodied in the form of a sequence of software instructions executable by a processor. In a second implementation, this method is embodied in the form of analog circuitry configured to operate in accordance with the method.

As shown, the process begins at a step 200, in which the previously-determined gain value is applied to the output of the image sensor. In step 201, the previously determined integration time period is applied to image capture.

In step 202, a brightness parameter of the signal output from the image sensor is measured. In one implementation, the brightness parameter is the average luminance of the image represented by the signal output from the image sensor. In step 210, a brightness parameter ratio is determined. In one implementation, the brightness parameter ratio is derived from the ratio of a desired brightness parameter to the measured brightness parameter.

Next, at a step 212, the desired effective exposure is determined. In one implementation, the desired effective exposure is derived from the product of the brightness parameter ratio and a previously-determined desired effective exposure, such as that determined in or upon completion of the second previous frame period. In this implementation, the desired effective exposure is the level of effective exposure that should be achieved in order to bring the measured brightness parameter in line with the desired brightness parameter.

Next, the method of operation branches to steps 214 and 216. In step 214, the gain needed to achieve this desired effective exposure in the next frame period is determined. In one implementation, this gain is derived from the ratio of the desired effective exposure determined in step 212, and the integration time period applied in step 201. In step 216, the integration time period needed to achieve this desired effective exposure in the third subsequent frame period is determined. In one implementation, this value is derived from the ratio of desired effective exposure determined in step 212, and a nominal gain. In one implementation, the nominal gain is selected to avoid introducing an undesirable level of noise in the displayed image. In another implementation, the nominal gain is selected to permit the amplifier to operate in a desired range of operation. It is contemplated that the nominal gain can be a fixed value, or vary from one frame period to the next, or vary at periodic or intermittent intervals.

One method of determining nominal gain which is contemplated involves using trial and error, in which the value used for nominal gain is adjusted and system performance monitored. According to this method, the nominal gain is adjusted until the noise in the displayed image is reduced to an acceptable level, and it is determined that system speed and performance are not sacrificed at low light levels.

In optional step 218, the gain determined in step 214, and the integration time period determined in step 216, are stored for subsequent application respectively to the output of the image sensor and image capture by the image sensor. In one implementation, this step is only necessary if the calculation of the gain and integration time adjustments in steps 214 and 216 substantially precedes the frame period in which these adjustments are applied.

In step 219, a determination is made whether a new frame period has been entered. If not, a loopback to the beginning of step 219 is executed, and if so, a jump to the beginning of step 200 is executed. In one implementation, it is contemplated that the jump to step 200 occur when the next successive frame period is entered. However, other implementations are contemplated in which the jump to step 200 occurs only after a predetermined or intermittent number of additional frame periods have been entered.

B. Second Embodiment

Figure 6:
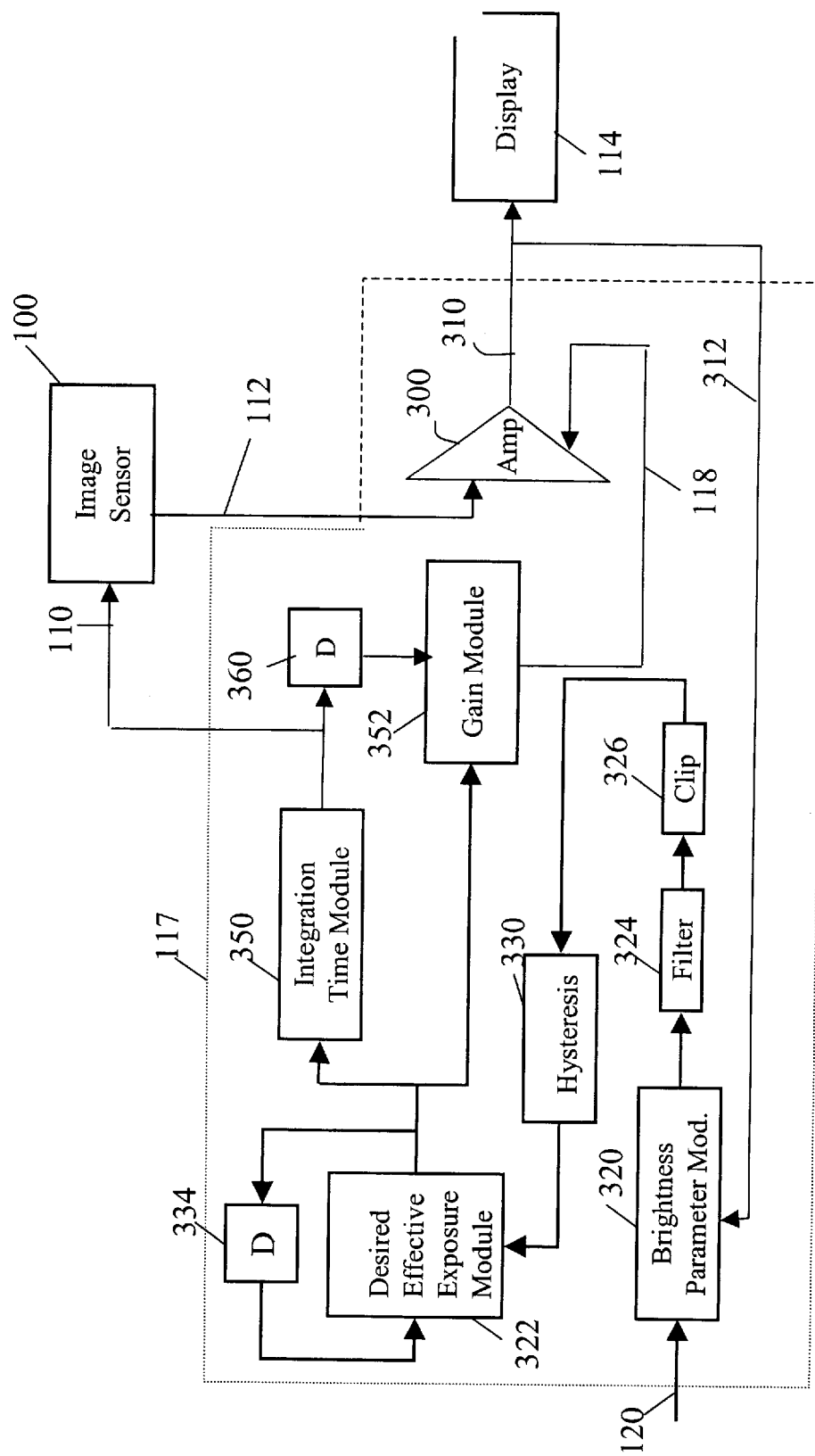
FIG. 6 is a block diagram of a second embodiment of the subject invention.

FIG. 6 illustrates the second embodiment of the present invention. In comparison to the first embodiment as shown in FIG. 4, like elements are referenced with like reference numerals.

The second embodiment includes an image sensor 100 configured to capture an image at an integration time specified by a signal on signal line 110, and output on signal line 112 a signal representative of that image. Amplifier 300 is configured to receive over signal line 112 the signal from image sensor 100, and, responsive to the signal on signal line 118 representative of a gain, amplify the input signal at the level of gain indicated by the signal on signal line 118, and output the amplified signal on signal line 310. Display 114 is configured to receive over signal line 310 the amplified signal from amplifier 300 and display the image represented by the amplified signal on signal line 310. Although the amplifier has been, for purposes of simplifying the discussion, referred to as amplifying the signal on signal line 112, it should be appreciated that the level of gain directed by the signal on signal line 118 may be greater than, equal to, or less than one. Thus, it is expressly contemplated that the amplifier 300 may leave unchanged or even attenuate the signal on signal line 112 depending on whether the level of gain called for is respectively unity or less than unity, and that such actions are within the scope of phrases such as "gain" or "amplify" for purposes of this disclosure.

The image sensor 100 is configured to capture an image in accordance with an integration time period specified by a signal on signal line 110. The signal on signal line 110 represents an integration time period determined by integration time module 350. Thus, as configured, the image sensor 100 captures an image in accordance with the integration time period determined by module 350.

Integration time module 350 is configured to determine an integration time period based on a signal provided by desired effective exposure module 322 and representative of the desired effective exposure. In one implementation, the integration time module 350 is configured to derive the integration time period from the ratio of the desired effective exposure as determined by module 322 to a nominal gain of the type discussed previously in relation to the first embodiment. This relationship is expressed by the following formula in which subscripts refer to the frame period during which or upon completion of which a parameter is determined (and thus which is logically associated with the parameter), in contrast to when the parameter is applied either to image amplification or image capture:

$$\text{Integration Time Period}_n \leftarrow \frac{\text{Desired Effective Exposure}_n}{\text{Nominal Gain}}$$

The backward arrow in the foregoing mathematical relationship is intended to depict derivation as opposed to strict equality.

Delay element 360 is configured to store for at least a frame period a signal representative of the integration time period as determined by integration time module 350.

Gain module 352 is configured to determine a gain based on the integration time period determined in or upon completion of a previous frame as output from delay element 360 and the desired effective exposure as determined by desired effective exposure module 322, and to output a signal to amplifier 300 representative of this gain. This relationship is expressed by the following formula, in which the subscripts thereof have the same meaning as defined previously:

$$\text{Gain}_n \leftarrow \frac{\text{Desired Effective Exposure}_n}{\text{Integration Time Period}_n}$$

As configured, the amplifier 300 amplifies the output of image sensor 100 on signal line 112 in accordance with this gain value.

Brightness parameter module 320 is configured to receive as an input over signal line 312 the output of amplifier 300, and measure a brightness parameter of the image represented by the signal on this line. The brightness parameter is of the type discussed in relation to the first embodiment, and may include the average brightness of the image or the peak brightness of this image. In one implementation, the brightness parameter is the average magnitude of the luminance of the image represented by the signal on signal line 312.

The brightness parameter module is also configured to receive, as an input over signal line 120, a signal representing the desired level of the brightness parameter. In one implementation, the desired level is set by a user using a dial control, but it should be appreciated that this level may be established through other means, such as through a software interface.

In one implementation, brightness parameter module 320 is configured to derive a brightness parameter ratio from the ratio of the desired level of the brightness parameter to the measured level of the brightness parameter. The following formula defines this relationship:

$$\text{Brightness Parameter Ratio}_n \leftarrow \frac{\text{Desired Level Of Brightness Parameter}}{\text{Measured Level Of Brightness Parameter}_n}$$

Filter 324 is coupled to the output of the brightness parameter module 320. In one implementation, the filter 324 subjects the brightness parameter ratio as determined by module 320 to high frequency filtering to remove high frequency oscillations that may occur from minute changes in the light source illuminating the subject matter of the image and other noise introduced by the tap of the image signal. For example, certain high frequency noise may be introduced into the signal based on a particular light source which is used to light the work area.

Clipping circuit 326 is coupled to the output of the filter 324. In one implementation, clipping circuit 326 clips or limits the maximum value of the filtered brightness parameter ratio as output from filter 324 to a pre-determined level. This restricts the ratio to a maximum level, thereby limiting the size of the change in the brightness parameter ratio. This prevents a large jump in integration time period and gain values which, in turn, inhibits flicker and large jumps in screen level brightness, a particular undesirable effect to the human eye.

The output of the clipping circuit 326 is coupled to the input of a hysteresis control circuit 330. In one implementation, the hysteresis control circuit 330 introduces a dead zone or hysteresis into the ratio, thereby inhibiting or preventing oscillation and hunting behavior in the feedback loop formed by signal line 312, module 320, filter 324, clipping circuit 326, hysteresis control circuit 330, module 322, modules 350 and 352, image sensor 110, and amplifier 300, when only insignificant changes in the ratio are called for based on the brightness parameter ratio. Thus, if the change in the brightness parameter ratio is below a certain threshold value, then the hysteresis control circuit 330 inhibits changing the brightness parameter ratio from its previous value.

Desired effective exposure module 322 is coupled to the output of the hysteresis control circuit 330, and to the output of delay element 334. It determines the desired effective exposure based on the desired effective exposure determined during or upon completion of a previous frame period and the brightness parameter ratio determined in or upon completion of the current frame period. In one implementation, the module is such that the desired effective exposure is derived from the product of the desired effective exposure determined during or upon completion of a previous frame period and the brightness parameter ratio as determined in or upon completion of the current frame period. This relationship is expressed by the following formula:

$$\text{Desired Effective Exposure}_n \leftarrow \text{Desired Effective Exposure}_{n-x} * \text{Brightness Parameter Ratio}_n$$

In one implementation example, the value of x in the foregoing mathematical relationship is 1, indicating that the desired effective exposure is derived from the product of the desired effective exposure for the previous frame, and the brightness parameter ratio for the current frame.

It is contemplated that block 117 of the second embodiment identified in FIG. 6 can be implemented in many ways, including as a processor configured to execute software code embodying the subject invention, or as analog circuitry configured in accordance with the subject invention.

Operation

FIGS. 7(*a*)–7(*c*) illustrate a second embodiment of a method of operation of the subject invention. FIG. 7(*a*) illustrates the overall method of operation in accordance with the second embodiment, FIG. 7(*b*) illustrates an implementation example of a method of forming the brightness parameter ratio, and FIG. 7(*c*) illustrates an implementation example of a method of performing hysteresis control to the brightness parameter ratio. Each of the methods of FIG. 7(*b*) and 7(*c*) may or may not be incorporated into the overall method of FIG. 7(*a*). The subscripts in each of these figures refer to the frame period during which or upon completion of which a parameter is determined in contrast to when it is applied.

With reference to FIG. 7(*a*), in step 500, the gain as determined in or upon completion of a previous frame period is applied to the output of the image sensor in the current frame period. In one implementation, this can be expressed by the following formula:

$$\text{Gain}_{n-x1} \rightarrow \text{Image Output}_n$$

In one implementation example, the value of x1 is 1, so that the gain determined in or upon completion of the previous frame period is applied to the image output in the current frame period.

In step 501, the integration time period (ITP) determined in or upon completion of a previous frame period is applied to image capture in the current frame period. In one implementation, this can be expressed by the following formula:

$$ITP_{n-x2} \rightarrow \text{Image Capture}_n$$

In one implementation example, the value of x2 is 1, so that the integration time period determined in or upon completion of the previous frame period is applied to image capture in the current frame period.

In step 502, a brightness parameter ratio is determined. In one implementation, this is derived from the ratio of a desired level of the brightness parameter to a brightness parameter from the image displayed in the current frame period. This ratio can be referred to as $BPR_n$.

In step 503, the desired effective exposure (DEE) is determined based at least in part on the brightness parameter ratio. In one implementation, this is derived from the product of the desired effective exposure determined during or upon completion of a previous frame period and the brightness parameter ratio of the current period. In one implementation example, this relationship can be expressed by the following formula:

$$DEE_n \rightarrow DEE_{n-x3} * BPR_n$$

In one instance of this implementation example, the value of x3 is 1, so that the desired effective exposure for the current frame is derived from the product of the desired effective exposure for the previous frame and the brightness parameter ratio for the current frame.

In step 504, the gain to be applied in a successive frame period is determined based at least in part on the desired effective exposure. In one implementation, this is derived from the ratio of desired effective exposure for the current frame period to the integration time period determined in or upon completion of a previous frame period. In one implementation example, this is expressed through the following:

$$\text{Gain}_n \leftarrow \frac{DEE_n}{ITP_{n-x4}}$$

In one instance of this implementation example, the value of x4 is 1, so that the gain to be applied in a successive time period is derived from the ratio of desired effective exposure for the current frame to the integration time period of the previous frame. A second instance of this implementation example is identical to the first except that the gain is applied in the next time period. A third instance of this implementation example is identical to the second, except that the integration time period determined in or upon completion of the previous frame period is applied to image capture in the current frame.

In step 505, the integration time period for a subsequent frame period is determined at least in part based on the desired effective exposure for the current frame period. In one implementation, this is derived from the ratio of the desired effective exposure for the current frame period and the nominal gain (NG). In one implementation example, this relationship can be expressed through the following formula:

$$ITP_n \leftarrow \frac{DEE_n}{NG}$$

In step 506, the desired effective exposure determined in or upon completion of the current frame period, $DEE_n$, is stored for use in at least one subsequent frame period. In optional step 507, if necessary, the gain determined in or upon completion of the current frame period, $GAIN_n$, is stored for use in at least one subsequent frame period. In optional step 508, if necessary, the integration time period determined in or upon completion of the current frame period, $ITP_n$, is stored for use in at least one subsequent frame period. Again, steps 507 and 508 would only be necessary if the adjustments to gain and integration time are determined substantially before the period in which these adjustments will be applied.

In step 509, the process loops until the occurrence of a new frame period. In one implementation, the new frame period is the next frame period. In another implementation, the new frame period is a subsequent frame period other than the next frame period. When this new frame period occurs, a jump is implemented to step 510, in which a counter for the frame period is incremented. This can be represented by the following formula:

$$n \rightarrow n+x5$$

In one implementation example, the value of x5 is 1.

A jump is then made to step 500, whence the process repeats itself.

Figure 7A:
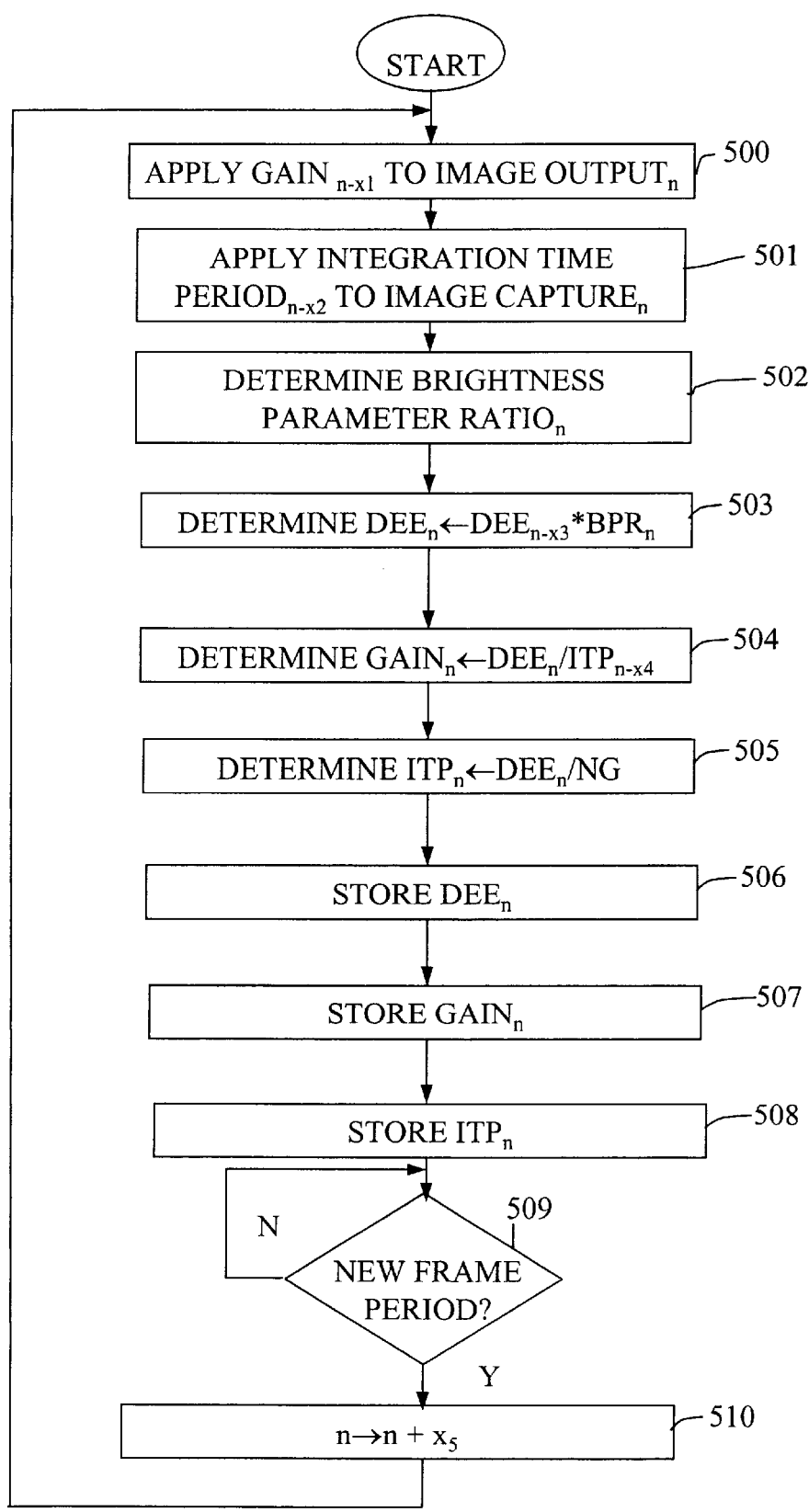
FIGS. 7(a)–7(c) are flowcharts of a second embodiment of a method of operation of the subject invention.
Figure 7B:
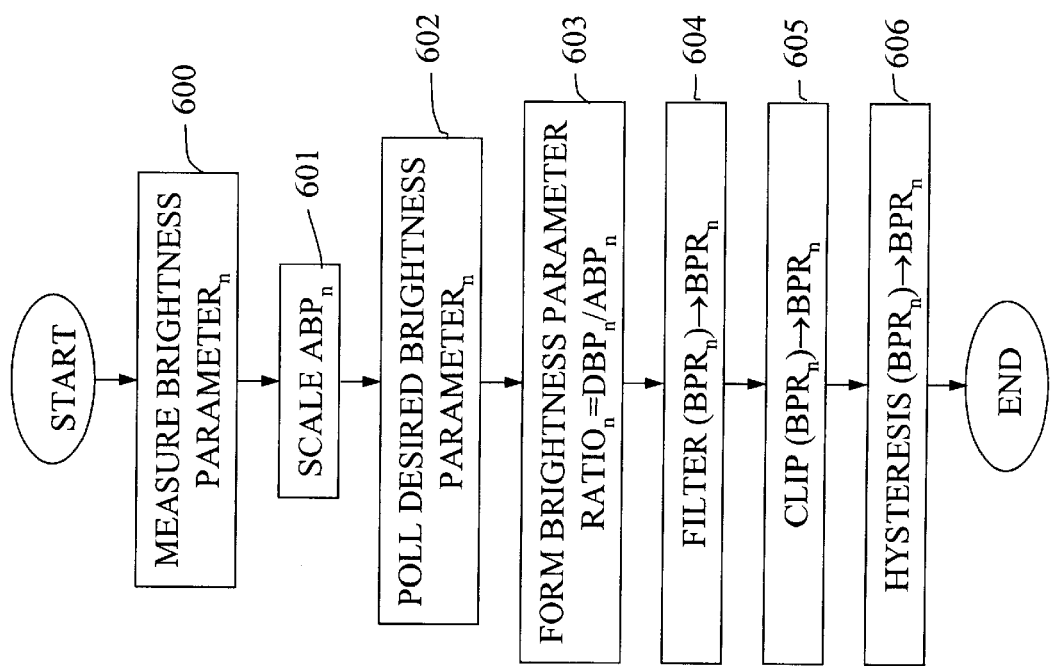

FIG. 7(b) is a flowchart illustrating one embodiment of the substeps involved in performing step 502 in FIG. 7(a), the step of determining the brightness parameter ratio for the current frame period.

In substep 600, the brightness parameter of the image being displayed in the current frame period or displayed in a previous frame period is determined. In one implementation, the brightness parameter is measured from the image displayed in the current frame period. In one implementation example, the brightness parameter is the average luminance of this image.

In optional substep 601, the brightness parameter determined in substep 601 is scaled to achieve compatibility between two or more of the image sensor, the image display device, and the automatic exposure control system of the subject invention. In one implementation, this substep is performed in a Sony CXA 2006Q correlated double sampler.

In substep 602, the desired brightness parameter is determined. In one implementation, this substep is performed once during a set-up process. In another implementation, this substep is performed periodically or intermittently.

In substep 603, a brightness parameter ratio is derived from the ratio of the desired brightness parameter (DBP) determined in substep 602, and the actual or measured brightness parameter initially determined in substep 600, and optionally processed in substep 601.

In substep 604, the brightness parameter ratio determined in substep 603 is optionally filtered. This substep can be represented by the following formula:

$$\text{FILTER}(BPR_n) \rightarrow BPR_n$$

In one implementation, the ratio is filtered to remove high-frequency noise.

In substep 605, the brightness parameter ratio initially determined in substep 603, and optionally filtered in substep 604, is clipped to limit the maximum amount of variance that the ratio may undergo from one frame period to the next. As discussed above, this advantageously eliminates noticeable flicker and large jumps in brightness level between frames. This substep can be represented by the following formula:

$$\text{CLIP}(BPR_n) \rightarrow BPR_n$$

In substep 606, hysteresis processing is optionally performed on the brightness parameter ratio initially determined in substep 603, optionally filtered in substep 604, and optionally clipped in substep 605. In one implementation, this substep sets the brightness parameter ratio for the current frame to that of a previous frame if the change between the brightness parameter remaining after substep 605, and the brightness parameter ratio of this previous frame, is below a predetermined threshold. The objective in this implementation is to prevent undesirable hunting and oscillation due to minute changes in the ratio.

Hysteresis Subroutine

Figure 7C:
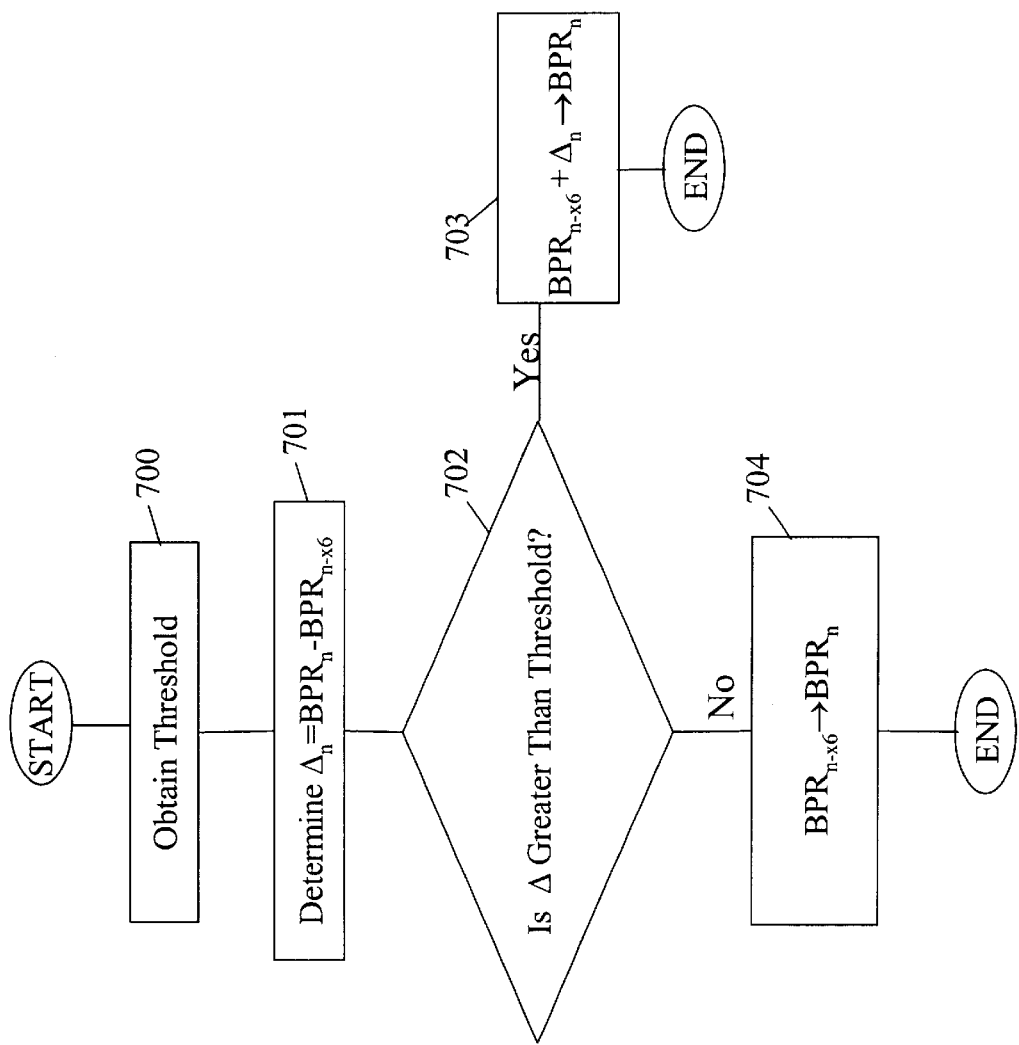

FIG. 7(c) illustrates one embodiment of a subroutine to perform substep 606, the hysteresis substep, of FIG. 7(b). According to this embodiment, at block 700, a threshold is determined. In one implementation, this threshold is fixed. In another implementation, it is variable. In a third implementation, it varies periodically or intermittently.

In block 701, the change between the brightness parameter ratio as initially determined in substep 603 of FIG. 7(b), and optionally processed in substeps 604 and 605 of that figure, and the brightness parameter determined in or upon completion of a previous frame, is determined. Identifying this change as $\Delta_n$, this relationship can be expressed by the following equation:

$$\Delta_n = BPR_n - BPR_{n-x6}$$

In one implementation, the value of x6 is 1, so that $\Delta_n$ is set equal to or at least derived from the change in the brightness parameter ratio for the previous frame period.

In decision block 702, the value of $\Delta_n$ as determined in block 701 is compared with the threshold determined in block 700. If $\Delta_n$ is greater than the threshold, then block 703 is performed. In block 703, the change is accepted, and the brightness parameter ratio for the current frame period is set equal to the value initially determined in substep 502 of FIG. 7(a), and optionally processed in substeps 503 and 504. This relationship can be expressed by the following formula:

$$BPR_{n-x6} + \Delta_n \rightarrow BPR_n$$

The subroutine then terminates.

In decision block 702, if the change determined in block 701 is less than or equal to the threshold, block 704 is executed. In block 704, the change determined in block 701 is ignored, and brightness parameter for the current frame period is set equal to the brightness parameter ratio of a previous frame period. This relationship can be expressed through the following equation:

$$BPR_{n-x6} \rightarrow BPR_n$$

In one implementation, the value of x6 is 1, so that, in this implementation, the brightness parameter ratio for the current frame period is set equal to the brightness parameter ratio for the previous frame period. The subroutine then ends.

Input Chart

FIG. 8 is a chart showing the inputs and outputs for each of the brightness parameter module 320, the desired effective exposure module 322, the integration time module 350, and the gain module 352 in the foregoing second embodiment. As shown, the inputs to gain module 352 are $ITP_{n-x4}$ and $DEE_n$, and the output is $GAIN_n$; the inputs to integration time module 350 are NG and $DEE_n$, and the output is $ITP_n$; the inputs to desired effective exposure module 322 are $BPR_n$ and $DEE_{n-x3}$, and the output is $DEE_n$; and the inputs to brightness parameter module 320 are $ABP_n$ and $DBP_n$, and the output is $BPR_n$.

It should be appreciated that embodiments are contemplated in which a "look-ahead" feature is provided. According to this "look-ahead" feature, the brightness parameter of an image is measured before that image is displayed. The parameter is used to determine a gain adjustment to be applied to that image as it is being displayed, in contrast to a subsequent image. With reference to FIG. 1, for example, it is contemplated that a brightness parameter of an image could be measured by tapping into the signal lines between the sensor array 5 and the readout register 6 as the image is being transferred to the readout register 6. This value would then used to determine a gain to be applied to that image as it is displayed.

In a similar manner, a separate brightness sensor mounted adjacent to the CCD could provide early measurement of a brightness parameter.

Exemplary Implementations

Figure 9A:
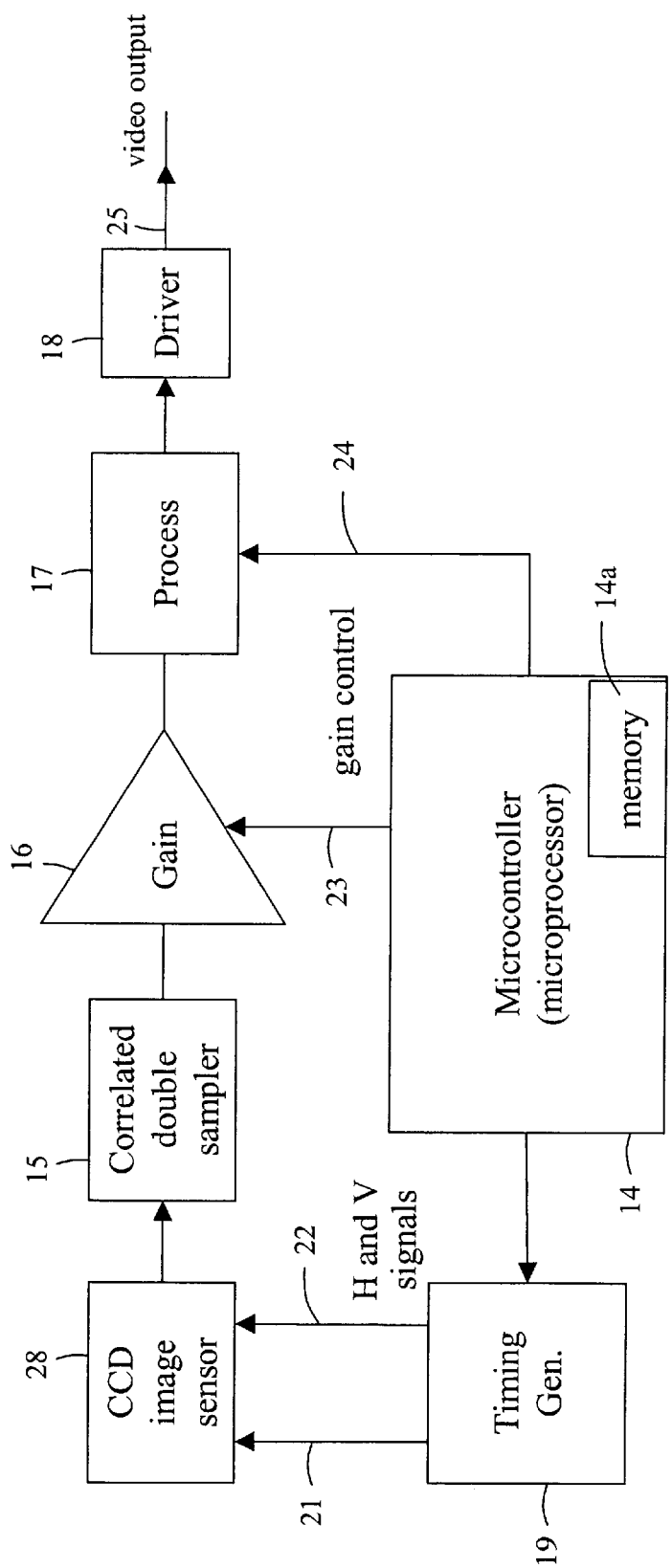
FIG. 9(a)–9(b) are block diagrams of implementation examples of video cameras incorporating the subject invention.

With reference to FIG. 9(a), an example implementation of a video camera system configured in accordance with the subject invention is illustrated. The system comprises CCD image sensor 28, correlated double sampler 15, amplifier 16, processing device 17, driver 18, microcontroller 14, and timing generator 19. The microcontroller is coupled to timing generator 19, and is configured to direct the timing generator 19 to issue appropriate timing signals to CCD image sensor 28 over signal line 22, and a desired integration time period over signal line 21. In this example implementation, these include horizontal and vertical timing signals which, as known to those of skill in the art, comprise the V1, V2, V3, V4, H1, H2, and RG signals. The microcontroller 14 is also coupled to amplifier 16 through signal line 23, and is configured to direct the amplifier to amplify the output of correlated double sampler 15 in accordance with the gain indicated on signal line 23. The microcontroller 14 is also coupled to process device 17 process through signal line 24, and is configured to direct the process device 17 to process the output of amplifier 16 responsive to the signal on signal line 24.

The CCD image sensor 28 is of the type previously discussed. It provides an output signal representative of an image captured in accordance with the integration timer period indicated on signal line 21. Correlated double sampler 15 is coupled to CCD image sensor 28, and is configured to remove correlated noise from the signal output from CCD image sensor 28. Amplifier 16 is coupled to the correlated double sampler 15, and is configured to amplify the output of correlated double sampler 15 in accordance with the gain indicated on signal line 23. Process device 17 is coupled to the output of amplifier 16, and is configured to process the output of amplifier 16 responsive to the signal on signal line 24. Driver 18 is coupled to the output of process device 17, and is configured to provide a video output signal on signal line 25 responsive to the output from process device 17. The function of the process device 17 and driver 18 are known to those of skill in the art, and need not be further discussed here. Additional details on endoscopic video cameras are contained in U.S. Pat. Nos. 5,841,491; 5,696,553; 5,587,736; 5,428,386; and co-pending U.S. patent application Ser. Nos. 09/044,094; 08/606,220; and 08/589,875; previously incorporated herein by reference.

The microcontroller 14 includes internal memory 14a for the storage of software embodying the subject invention. Responsive to the execution of this software, microcontroller 14 is configured to direct timing generator 19 to provide on signal line 21 an integration time period determined in accordance with the subject invention, and to provide on signal line 23 a gain determined in accordance with the subject invention.

In this implementation example, the CCD image sensor is a Sony ICX 038DNB; the correlated double sampler is a Sony CXA 2006Q which also serves as the amplifier (both are combined in one unit); the driver is a Maxim Max 428; the timing generator is a Sony CXD 1267R; and the microcontroller is a Motorola MC68HC016.

Figure 9B:
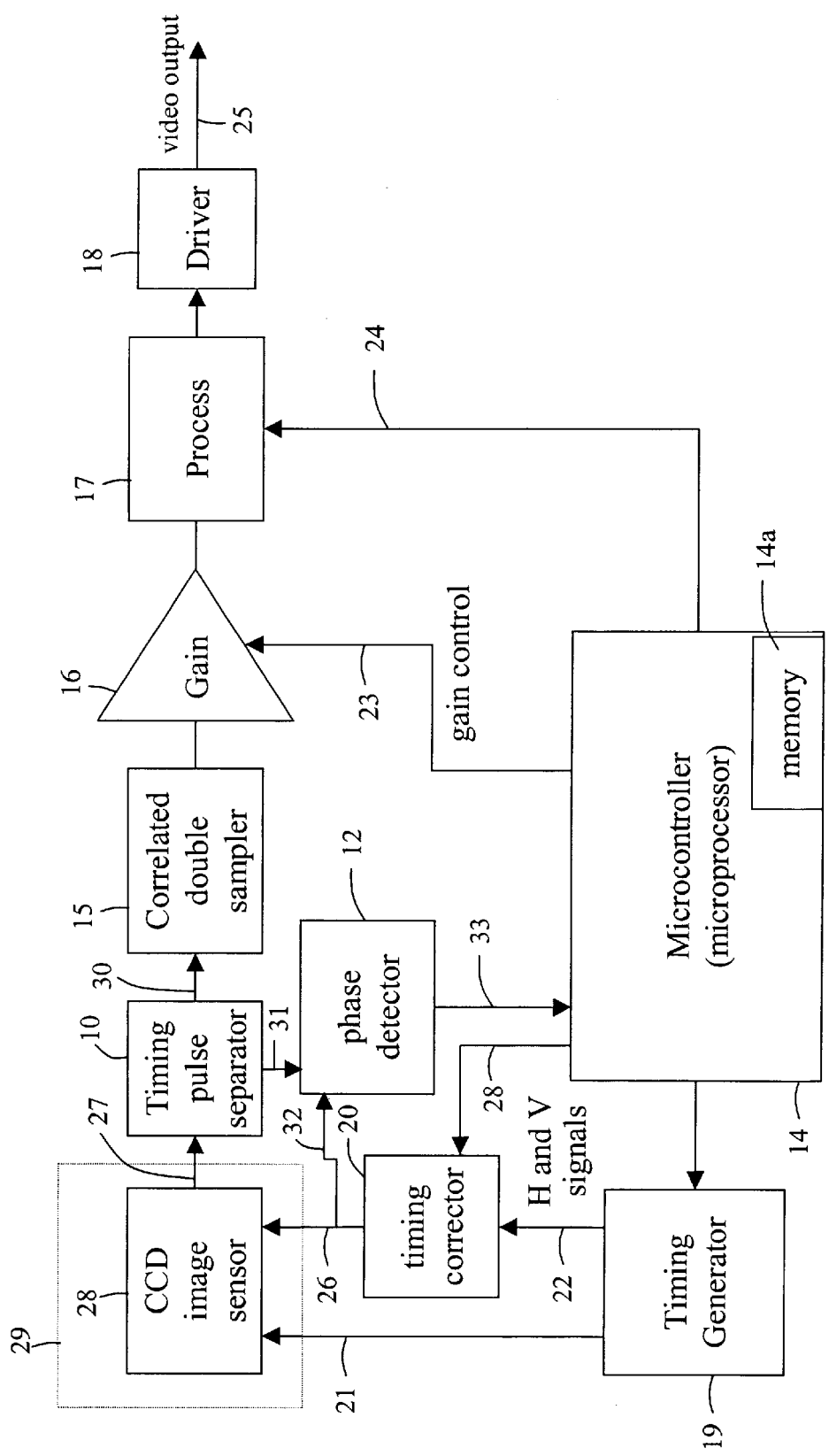

A second implementation example of a video camera system incorporating the subject invention is illustrated in FIG. 9(b) in which, compared to FIG. 9(a), like elements are identified with like reference numerals. This example is similar to the first except that here, the CCD image sensor and related electronics are configured within a camera head 29, and the remaining components of the system illustrated in FIG. 9(b) are configured within a control unit which is detached from and remotely coupled to camera head 29 through a cable or a wireless interface. In relation to the example of FIG. 9(a), like elements in FIG. 9(b) are configured to function the same as corresponding elements in FIG. 9(a), and the functioning of these elements need not be explained further. The additional elements in FIG. 9(b) comprise timing corrector 20, timing pulse separator 10, and phase detector 12.

Timing corrector 20 receives the H and V timing signals from timing generator 19, and, responsive thereto, passes the V timing signals to the CCD image sensor, but delays the H timing signals by a predetermined amount as indicated by microcontroller 14 on signal line 22. The predetermined delay is designed to account for the delay in passage of the H timing signals through the cable or wireless interface.

As is known by those of skill in the art, the CCD image sensor generates on signal line 27 a composite signal comprising an image component signal and a reference component signal. The timing pulse separator 10 receives the composite signal over signal line 27, and responsive thereto, separates the reference component signal from the image component signal. The timing pulse separator 10 then outputs the image component signal on signal line 30, and the reference component signal on signal line 31.

Phase detector 12 receives the reference component signal over signal line 12, and the delayed H timing signals output by timing generator 20, and responsive thereto, determines the phase difference between the reference signal component and the delayed H timing signals. This value is then output to microcontroller 14 over signal line 33. Responsive thereto, the microcontroller 14, during a set-up mode of operation, iteratively increases the delay applied to the H timing signals by timing corrector 20 until the phase difference reported by phase detector 12 is at a minimum. The value of this delay is then stored, and becomes the predetermined delay which is used to delay the H timing signals in a steady state mode of operation.

The part numbers of the components in the second implementation example are identical to like parts in the first implementation. In addition, the timing corrector 20 comprises two PCA Electronics programmable delay lines, Part Nos. 1888 and 1889, one with a 2 nsec. step delay, and the other with a 10 nsec. step delay, the combination achieving a 2 nsec. resolution for the delay. The phase detector 12 in this implementation example comprises a Signetics 74HC4046A phase detector. In this example, timing corrector 20 is configured to compensate for the delay incident to round trip passage of the H timing signals through a 10 ft. cable. Current estimates are that this delay is 30 nsec., with 15 nsec. being experienced each way. Additional details on this implementation example are provided in U.S. Pat. No. 5,696,533, previously incorporated herein by reference.

FIGS. 10(a)–10(c), 11(a)–11(k), and 12 comprise a listing of the software code which is executed by microcontroller 14 in the foregoing two implementation examples. According to these implementation examples, the microcontroller 14 executes this code, and responsive thereto, controls over signal line 23, in accordance with the subject invention, the gain applied by amplifier 16 to the output of image sensor 28, and controls over signal line 21, in accordance with the subject invention, the integration time period applied by image sensor 28 to image capture.

FIGS. 10(a)–10(c) comprise a listing of the code module entitled VSyncISR. This module is the primary code module responsible for automatic exposure adjustment in accordance with the subject invention. This code module is executed once per frame by microcontroller 14. It contains several sub-modules. These sub-modules comprise GetLumaAverage, SendShutter and SendGain. The GetLumaAverage sub-module reads and synthesizes the actual brightness or rumination level of the signal sent to the display to obtain an actual brightness parameter which, in this implementation, is the lumination level averaged over the pixels represented in the signal sent to the display. The SendShutter sub-module transmits to the CCD image sensor 28 the integration time period which governs image capture during the frame period. The SendGain sub-routine is responsible for transmitting to amplifier 116 a gain value which is applied to the output of the image sensor 28 during the frame period.

FIGS. 11(a)–11(k) are listings of the ComputeExposure module, the ComputerShutter module, and the ComputeGain module. The ComputeExposure module generates the current desired effective exposure based on the desired effective exposure for the previous frame period and the actual brightness parameter as read by the GetLumaAverage sub-module in the current frame period. The ComputeExposure module proceeds in three basic steps. First, it forms the ratio of the desired brightness parameter to the actual brightness parameter as obtained by the GetLumaAverage sub-module. Second, it processes the brightness parameter ratio determined in the first step through filtering, clipping, and hysteresis processing operations. Third, it determines the desired effective exposure for the current frame period by multiplying the desired effective exposure for the previous frame by the processed brightness parameter ratio. The ComputeExposure module also calls the ComputeShutter and ComputeGain modules to determine the integration time period and gain values to be applied in the next frame period.

The ComputeShutter module generates the integration time period for the next frame period by dividing the current desired effective exposure by the nominal gain value. The ComputeGain module generates the gain value for the next frame period by dividing the current desired effective exposure by the integration time period applied in the current frame.

FIG. 12 is a listing of the Exposure.h module, which contains the definitions of constants used on the software modules listed in FIGS. 10(a)–10(c) and FIGS. 11(a)–11(k). The Exposure.h module contains the different constants which may applied to video signals configured in accordance with the NTSC and PAL standards. This allows the foregoing implementation examples to operate in relation to either standard.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A video camera system comprising:

an image sensor configured to capture an image in a frame period and provide an output signal representative of the image in the next frame period, the image capture being performed responsive to an input signal representative of a particular value of a variable integration time;

an amplifier configured to amplify the output signal responsive to an input signal representative of a particular value of a variable gain;

means for measuring a brightness parameter of the image represented by the output signal of the image sensor during a frame period, and responsive thereto, determining the integration time to be applied to the image sensor output signal in the frame period after the next, and the gain to be applied by the amplifier in the next frame period; and means for inputting the integration time and amplifier gain which results from the foregoing to the respective integration time and gain inputs of the image sensor and amplifier, respectively, whereby any adjustment in integration time which is represented by the foregoing is applied to the image sensor output signal capture in the frame period after the next, and any adjustment in amplifier gain which is represented by the foregoing is applied to amplification of the image sensor output signal in the next frame period.

2. The system of claim 1 wherein the image sensor is a CCD.

3. A video camera system comprising:

an image sensor configured to capture an image in a time period and provide an output signal representative of the image in a subsequent time period, the image capture being performed responsive to an input signal representative of a particular value of a variable integration time;

an amplifier configured to amplify the output signal responsive to an input signal representative of a particular value of a variable gain;

means for determining a desired effective exposure of the image represented by the output signal of the image sensor during a time period, the desired effective exposure representing the compound effect on exposure of image sensor integration time and amplifier gain;

means, responsive to the desired effective exposure, for determining the integration time to be applied to the image sensor output signal in a subsequent time period, and for determining the gain to be applied by the amplifier in a subsequent time period; and means for inputting the integration time which results from the foregoing to the integration time input of the image sensor during a subsequent time period, and for inputting the amplifier gain which results from the foregoing to the gain input of the amplifier during a subsequent time period, whereby any adjustment in integration time which is represented by the foregoing is applied to the image sensor output signal in a second subsequent time period, and any adjustment in amplifier gain which is represented by the foregoing is applied to amplification of the image sensor output signal in a first subsequent time period preceding the second subsequent time period.

4. The system of claim 3 wherein the means for determining determines the integration time to be applied to the image sensor output signal in a subsequent time period responsive to a nominal amplifier gain and the desired effective exposure.

5. The system of claim 4 wherein the means for determining determines the gain to be applied by the amplifier in a subsequent time period responsive to an integration time applied to the image sensor output signal in a current or previous time period and the desired effective exposure.

6. The system of claim 3 wherein the desired effective exposure is determined responsive to the desired effective exposure for a previous time period, and a comparison between a desired brightness parameter and a measured brightness parameter derived from the image represented by the output signal in a current time period.

7. A video camera system comprising:

an image sensor configured to capture an image in a time period and provide an output signal representative of the image in a subsequent time period, the image capture being performed responsive to an input signal representative of a particular value of a variable integration time;

an amplifier configured to amplify the output signal responsive to an input signal representative of a particular value of a variable gain;

means for determining the integration time to be applied to the image sensor output signal in a subsequent time period responsive to a nominal amplifier gain expected or desired to be in effect, and for determining the gain to be applied by the amplifier in a subsequent time period responsive to the integration time applied to the image sensor output signal in a current or previous time period; and means for inputting the integration time which results from the foregoing to the integration time input of the image sensor during a subsequent time period, and for inputting the amplifier gain which results from the foregoing to the gain input of the amplifier during a subsequent time period, whereby any adjustment in integration time which is represented by the foregoing is applied to the image sensor output signal in a second subsequent time period, and any adjustment in amplifier gain which is represented by the foregoing is applied to amplification of the image sensor output signal in a first subsequent time period preceding the second subsequent time period.

8. The system of claim 7 wherein the determining means determines the integration time to be applied to the image sensor output signal in a subsequent time period by dividing a desired effective exposure for the image sensor by the nominal gain.

9. The system of claim 8 wherein the determining means determines the gain to be applied by the amplifier in a subsequent time period by dividing the desired effective exposure by the integration time applied to the image sensor output signal in a current or previous time period.

10. A method of controlling effective exposure of images captured by an image sensor and amplified by an amplifier in a video camera system, the image sensor configured to perform image capture responsive to a particular value of a variable integration time, and the amplifier configured to amplify a signal representative of an image responsive to a particular value of a variable gain, the method comprising:

measuring a brightness parameter of an image output by the image sensor during a frame period;

determining, responsive to the measured brightness parameter, the integration time to be applied to an image output by the sensor in the frame period after the next;

determining, responsive to the measured brightness parameter, the gain to be applied by the amplifier in the next frame period;

applying any adjustment in integration time which is represented by the foregoing to the image output by the sensor in the frame period after the next; and applying any adjustment in amplifier gain which is represented by the foregoing to amplification of an image output by the sensor in the next frame period.

11. A method of controlling effective exposure of images captured by an image sensor and amplified by an amplifier in a video camera system, the image sensor configured to perform image capture responsive to a particular value of a variable integration time, and the amplifier configured to amplify a signal representative of an image responsive to a particular value of a variable gain, the method comprising:

determining a desired effective exposure responsive to an image output by the image sensor during a time period, the desired effective exposure representing the compound effect on exposure of image sensor integration time and amplifier gain;

determining, responsive to the desired effective exposure, the integration time to be applied to an image output by the sensor in a subsequent time period;

determining, responsive to the desired effective exposure, the gain to be applied by the amplifier in a subsequent time period;

applying any adjustment in integration time which is represented by the foregoing to an image output by the sensor in a second subsequent time period; and applying any adjustment in amplifier gain which is represented by the foregoing to amplification of an image output by the sensor in a first subsequent time period preceding the second subsequent time period.

12. The method of claim 11 wherein the second determining step comprises determining the integration time to be applied to an image output by the sensor in a subsequent time period responsive to a nominal amplifier gain and the desired effective exposure.

13. The method of claim 12 wherein the third determining step comprises determining the gain to be applied by the amplifier in a subsequent time period responsive to an integration time applied to an image output by the sensor in a current or previous time period and the desired effective exposure.

14. The method of claim 11 wherein the first determining step comprises determining the desired effective exposure responsive to the desired effective exposure for a previous time period, and a comparison between a desired brightness parameter and a measured brightness parameter derived from an image output by the image sensor in a current time period.

15. The method of claim 14 wherein the first determining step comprises deriving the desired effective exposure from the product of the desired effective exposure for a previous time period and a brightness parameter ratio derived from the ratio of the desired brightness parameter to the measured brightness parameter.

16. The method of claim 15 wherein the second determining step comprises deriving the integration time for a subsequent time period from the desired effective exposure divided by the nominal gain.

17. The method of claim 16 wherein the third determining step comprises deriving the amplifier gain for a subsequent time period from the desired effective exposure divided by the integration time applied to an image output by the sensor in a current or previous time period.

18. A method of controlling effective exposure of images captured by an image sensor and amplified by an amplifier in a video camera system, the image sensor configured to perform image capture responsive to a particular value of a variable integration time, and the amplifier configured to amplify a signal representative of an image responsive to a particular value of a variable gain, the method comprising:

determining the integration time to be applied to an image output by the sensor in a subsequent time period directly responsive to a nominal amplifier gain expected or desired to be in effect;

determining the gain to be applied by the amplifier in a subsequent time period responsive to the integration time applied to an image output by the sensor in a current or previous time period;

applying any adjustment in integration time which is represented by the foregoing to an image output by the sensor in a second subsequent time period; and applying any adjustment in amplifier gain which is represented by the foregoing to amplification of an image output by the sensor in a first subsequent time period preceding the second subsequent time period.

19. The method of claim 18 wherein the first determining step comprises deriving the integration time to be applied to an image output by the sensor in a subsequent time period from a desired effective exposure reflecting the compound effect of image sensor integration time and amplifier gain divided by the nominal gain.

20. The method of claim 19 wherein the second determining step comprises deriving the gain to be applied by the amplifier in a subsequent time period from the desired effective exposure divided by the integration time applied to an image output by the sensor in a current or previous time period.

21. A computer program product tangibly embodying any of the methods of claims 10 through 20.

22. A processor readable medium holding software instructions embodying any of the methods of claims 10 through 20.

23. A system comprising the processor readable medium of claim 22 and a processor configured to access and execute the software instructions held by the processor readable medium.

* * * * *